(12) United States Patent
Galvanauskas et al.

(10) Patent No.: US 7,656,578 B2
(45) Date of Patent: Feb. 2, 2010

(54) MICROCHIP-YB FIBER HYBRID OPTICAL AMPLIFIER FOR MICRO-MACHINING AND MARKING

(75) Inventors: Almantas Galvanauskas, Ann Arbor, MI (US); Donald J. Harter, Ann Arbor, MI (US); Martin E. Fermann, Ann Arbor, MI (US); Ferenc Raksi, Ann Arbor, MI (US)

(73) Assignee: IMRA America, Inc., Ann Arbor, MI (US)

( * ) Notice: Subject to any disclaimer, the term of this patent is extended or adjusted under 35 U.S.C. 154(b) by 0 days.

(21) Appl. No.: 11/372,185

(22) Filed: Mar. 10, 2006

(65) Prior Publication Data

US 2006/0171018 A1    Aug. 3, 2006

Related U.S. Application Data

(63) Continuation of application No. 10/958,593, filed on Oct. 6, 2004, now abandoned, which is a continuation of application No. 10/645,662, filed on Aug. 22, 2003, now abandoned, which is a continuation of application No. 09/317,221, filed on May 24, 1999, now abandoned, which is a continuation-in-part of application No. 09/116,241, filed on Jul. 16, 1998, now Pat. No. 6,208,458, which is a continuation-in-part of application No. 08/822,967, filed on Mar. 21, 1997, now Pat. No. 6,181,463.

(51) Int. Cl.
*H01S 3/00* (2006.01)

(52) U.S. Cl. .......................... 359/333; 372/6

(58) Field of Classification Search ............. 359/333; 372/6; 385/27
See application file for complete search history.

(56) References Cited

U.S. PATENT DOCUMENTS 3,308,394 A    3/1967    Snitzer (Continued)

FOREIGN PATENT DOCUMENTS

DE    2844129 A1    4/1980

(Continued)

OTHER PUBLICATIONS

Lih-Mei Yang, Generation and Amplification of Ultrashort Pulses in Erbium, Neodymium, and Thulium Fibers, Dissertation Abstracts International, vol. 57, No. 6, Section B, p. 3823 (Dec. 1996).

(Continued)

*Primary Examiner*—Mark Hellner
(74) *Attorney, Agent, or Firm*—Sughrue Mion, PLLC

(57) ABSTRACT

The invention describes techniques for the control of the spatial as well as spectral beam quality of multi-mode fiber amplification of high peak power pulses as well as using such a configuration to replace the present diode-pumped, Neodynium based sources. Perfect spatial beam-quality can be ensured by exciting the fundamental mode in the multi-mode fibers with appropriate mode-matching optics and techniques. The loss of spatial beam-quality in the multi-mode fibers along the fiber length can be minimized by using multi-mode fibers with large cladding diameters. Near diffraction-limited coherent multi-mode amplifiers can be conveniently cladding pumped, allowing for the generation of high average power. Moreover, the polarization state in the multi-mode fiber amplifiers can be preserved by implementing multi-mode fibers with stress producing regions or elliptical fiber cores These lasers find application as a general replacement of Nd: based lasers, especially Nd:YAG lasers. Particularly utility is disclosed for applications in the marking, micro-machining and drilling areas.

16 Claims, 5 Drawing Sheets

U.S. PATENT DOCUMENTS

| | | |
|---|---|---|
| 3,350,654 A | 10/1967 | Snitzer |
| 3,355,674 A | 11/1967 | Hardy |
| 3,395,366 A | 7/1968 | Snitzer |
| 3,599,106 A | 8/1971 | Snitzer |
| 3,687,514 A | 8/1972 | Miller |
| 3,729,690 A | 4/1973 | Snitzer |
| 3,761,716 A | 9/1973 | Kapron |
| 3,777,149 A | 12/1973 | Marcatill |
| 3,779,628 A | 12/1973 | Kapron |
| 3,808,549 A | 4/1974 | Maurer |
| 3,826,992 A | 7/1974 | Friedl |
| 3,973,828 A | 8/1976 | Onoda |
| 4,050,782 A | 9/1977 | Uchida |
| 4,120,587 A | 10/1978 | Vali |
| 4,204,745 A | 5/1980 | Sakai |
| 4,260,221 A | 4/1981 | Marcuse |
| 4,447,125 A | 5/1984 | Lazay |
| 4,465,334 A | 8/1984 | Siemsen |
| 4,504,111 A | 3/1985 | Hunzinger |
| 4,515,431 A | 5/1985 | Shaw |
| 4,546,476 A | 10/1985 | Shaw |
| 4,553,238 A | 11/1985 | Shaw |
| 4,554,510 A | 11/1985 | Shaw |
| 4,556,279 A | 12/1985 | Shaw |
| 4,560,234 A | 12/1985 | Shaw |
| 4,603,940 A | 8/1986 | Shaw |
| 4,637,025 A | 1/1987 | Snitzer |
| 4,674,830 A | 6/1987 | Shaw |
| 4,680,767 A | 7/1987 | Hakimi |
| 4,708,421 A | 11/1987 | Desurvire |
| 4,712,075 A | 12/1987 | Snitzer |
| 4,723,824 A | 2/1988 | Shaw |
| 4,723,828 A | 2/1988 | Garel-Jones |
| 4,738,503 A | 4/1988 | Desurvire |
| 4,741,586 A | 5/1988 | Kim |
| 4,768,851 A | 9/1988 | Shaw |
| 4,780,877 A | 10/1988 | Snitzer |
| 4,782,491 A | 11/1988 | Snitzer |
| 4,787,927 A | 11/1988 | Mears |
| 4,815,079 A | 3/1989 | Snitzer |
| 4,815,804 A | 3/1989 | Desurvire |
| 4,817,205 A | 3/1989 | Asawa |
| 4,828,350 A | 5/1989 | Kim |
| 4,829,529 A | 5/1989 | Kafka |
| 4,832,437 A | 5/1989 | Kim |
| 4,859,016 A | 8/1989 | Shaw |
| 4,895,421 A | 1/1990 | Kim |
| 4,896,942 A | 1/1990 | Onstott |
| 4,913,520 A | 4/1990 | Kafka |
| 4,938,556 A | 7/1990 | Digonnet |
| 4,944,591 A | 7/1990 | McMichael |
| 4,955,014 A | 9/1990 | Kuppers |
| 4,964,131 A | 10/1990 | Liu |
| 4,991,923 A | 2/1991 | Kino |
| 5,032,001 A | 7/1991 | Shang |
| 5,048,026 A | 9/1991 | Shaw |
| 5,058,976 A | 10/1991 | DiGiovanni |
| 5,067,134 A | 11/1991 | Oomen |
| 5,074,633 A | 12/1991 | Cohen |
| 5,077,483 A | 12/1991 | Cloonan |
| 5,077,815 A | 12/1991 | Yoshizawa |
| 5,095,518 A | 3/1992 | Young |
| 5,108,183 A | 4/1992 | Fling |
| 5,121,460 A | 6/1992 | Tumminelli |
| 5,170,458 A | 12/1992 | Aoyagi |
| 5,175,785 A | 12/1992 | Dabby |
| 5,177,562 A | 1/1993 | Wysocki |
| 5,185,749 A | 2/1993 | Kalman |
| 5,187,759 A * | 2/1993 | DiGiovanni et al. .......... 385/27 |
| 5,189,676 A | 2/1993 | Wysocki |
| 5,226,049 A | 7/1993 | Grubb |
| 5,255,274 A | 10/1993 | Wysocki |
| 5,263,036 A | 11/1993 | De Bernardi |
| 5,311,525 A | 5/1994 | Pantell |
| 5,321,718 A | 6/1994 | Waarts |
| 5,349,602 A | 9/1994 | Mehuys |
| 5,353,363 A | 10/1994 | Keck |
| 5,363,386 A | 11/1994 | Smith |
| 5,381,431 A | 1/1995 | Zayhowski |
| 5,388,120 A | 2/1995 | Ackley |
| 5,400,350 A * | 3/1995 | Galvanauskas ................ 372/20 |
| 5,416,862 A | 5/1995 | Haas |
| 5,422,897 A | 6/1995 | Wyatt |
| 5,439,602 A | 8/1995 | Eckard |
| 5,450,427 A | 9/1995 | Fermann |
| 5,452,394 A | 9/1995 | Huang |
| 5,488,619 A | 1/1996 | Injeyan |
| 5,494,941 A | 2/1996 | Lutter |
| 5,499,134 A | 3/1996 | Galvanauskas |
| 5,508,845 A | 4/1996 | Frisken |
| 5,511,083 A | 4/1996 | D'Amato |
| 5,513,194 A | 4/1996 | Tamura |
| 5,513,196 A | 4/1996 | Bischel |
| 5,517,525 A | 5/1996 | Endo |
| 5,539,571 A | 7/1996 | Welch |
| 5,541,947 A | 7/1996 | Mourou |
| 5,546,415 A * | 8/1996 | Delfyett et al. ................ 372/25 |
| 5,546,484 A | 8/1996 | Fling |
| 5,553,163 A | 9/1996 | Nivelle |
| 5,559,816 A | 9/1996 | Basting et al. |
| 5,627,848 A | 5/1997 | Fermann |
| 5,627,854 A | 5/1997 | Knox |
| 5,659,558 A | 8/1997 | Tohmon |
| 5,659,644 A | 8/1997 | DiGiovanni |
| 5,689,519 A | 11/1997 | Fermann |
| 5,701,318 A | 12/1997 | Digonnet |
| 5,701,319 A | 12/1997 | Fermann |
| 5,720,894 A * | 2/1998 | Neev et al. ..................... 216/65 |
| 5,774,484 A | 6/1998 | Wyatt |
| 5,818,630 A | 10/1998 | Fermann |
| 5,828,802 A | 10/1998 | Stolen |
| 5,838,702 A | 11/1998 | Byer |
| 5,841,797 A | 11/1998 | Ventrudo |
| 5,844,927 A | 12/1998 | Kringlebotn |
| 5,854,865 A | 12/1998 | Goldberg |
| 5,861,970 A | 1/1999 | Tatham |
| 5,862,287 A | 1/1999 | Stock |
| 5,867,305 A * | 2/1999 | Waarts et al. .......... 359/337.12 |
| 5,880,877 A | 3/1999 | Fermann |
| 5,887,009 A | 3/1999 | Mandella |
| 5,905,745 A | 5/1999 | Grubb |
| 5,923,684 A | 7/1999 | DiGiovanni |
| 5,953,353 A | 9/1999 | Headley |
| 5,966,491 A | 10/1999 | DiGiovanni |
| 5,974,060 A * | 10/1999 | Byren et al. ................... 372/19 |
| 5,993,899 A | 11/1999 | Robin |
| 5,999,673 A | 12/1999 | Valentin |
| 6,031,849 A | 2/2000 | Ball |
| 6,034,975 A | 3/2000 | Harter |
| 6,044,188 A | 3/2000 | Kropp |
| 6,064,786 A | 5/2000 | Cunningham |
| 6,072,811 A | 6/2000 | Fermann |
| 6,081,369 A | 6/2000 | Waarts |
| 6,097,741 A | 8/2000 | Lin |
| 6,104,733 A | 8/2000 | Espindola |
| 6,141,143 A * | 10/2000 | Marshall ..................... 359/342 |
| 6,144,484 A * | 11/2000 | Marshall ..................... 359/333 |
| 6,157,763 A | 12/2000 | Grubb |
| 6,185,346 B1 | 2/2001 | Asawa |
| 6,188,705 B1 | 2/2001 | Krainak |
| 6,212,216 B1 | 4/2001 | Pillai |
| 6,236,498 B1 | 5/2001 | Freeman |
| 6,236,793 B1 | 5/2001 | Lawrence |
| 6,249,630 B1 | 6/2001 | Stock |

| | | |
|---|---|---|
| 6,275,512 B1 | 8/2001 | Fermann |
| 6,295,161 B1 | 9/2001 | Bazzocchi |
| 6,301,271 B1 | 10/2001 | Sanders |
| 6,304,352 B1 | 10/2001 | Cunningham |
| 6,320,885 B1 | 11/2001 | Kawai |
| 6,324,326 B1 | 11/2001 | Dejneka |
| 6,356,680 B1 | 3/2002 | Kirk |
| 6,373,867 B1 | 4/2002 | Lin |
| 6,415,076 B1 | 7/2002 | DeCusatis |
| 6,427,491 B1 | 8/2002 | Burke |
| 6,434,311 B1 | 8/2002 | Danziger |
| 6,487,338 B2 | 11/2002 | Asawa |
| 6,496,301 B1 | 12/2002 | Koplow et al. |
| 6,501,884 B1 | 12/2002 | Golowich |
| 6,510,265 B1 | 1/2003 | Giaretta |
| 6,567,583 B2 | 5/2003 | Mettler |
| 6,738,186 B2 | 5/2004 | Jiang |
| 6,751,388 B2 | 6/2004 | Siegman |
| 6,771,856 B2 | 8/2004 | Ralph |
| 6,885,682 B2 | 4/2005 | Fuse |
| 6,885,683 B1 | 4/2005 | Fermann |
| 6,904,219 B1 | 6/2005 | Fermann |
| 6,954,575 B2 | 10/2005 | Fermann |
| 6,956,887 B2 | 10/2005 | Jiang |
| 6,987,783 B2 | 1/2006 | Fajardo |
| 7,043,126 B2 | 5/2006 | Guan |
| 7,043,128 B2 | 5/2006 | DiGiovanni |
| 7,212,745 B2 | 5/2007 | Numata |
| 7,228,032 B2 | 6/2007 | Blauvelt |
| 7,231,114 B2 | 6/2007 | Jenkins |
| 7,242,870 B2 | 7/2007 | Guan |
| 7,248,762 B2 | 7/2007 | Hallemeier |
| 2001/0024458 A1 | 9/2001 | Fermann |
| 2003/0202547 A1 | 10/2003 | Fermann et al. |
| 2004/0213302 A1 | 10/2004 | Fermann |
| 2005/0008044 A1 | 1/2005 | Fermann et al. |
| 2005/0069269 A1 | 3/2005 | Libori |

FOREIGN PATENT DOCUMENTS

| | | |
|---|---|---|
| DE | 19635919 A1 | 3/1997 |
| DE | 198 28 154 A1 | 1/1999 |
| EP | 0208189 A2 | 6/1987 |
| EP | 0103382 B1 | 9/1989 |
| EP | 0704944 A1 | 4/1996 |
| EP | 0569174 B1 | 7/1996 |
| FR | 2441858 | 6/1980 |
| JP | 54121749 A | 9/1979 |
| JP | 61065208 | 4/1986 |
| JP | 61233314 A | 10/1986 |
| JP | 62-54986 | 3/1987 |
| JP | 6254986 | 10/1987 |
| JP | 63034521 | 2/1988 |
| JP | 3253823 A | 12/1991 |
| JP | 4253003 | 9/1992 |
| JP | 4273187 | 9/1992 |
| JP | 4322228 | 11/1992 |
| JP | 4507299 | 12/1992 |
| JP | 6059150 A | 4/1994 |
| JP | 7245439 | 9/1995 |
| JP | 8018137 | 1/1996 |
| JP | 08-228038 A | 3/1996 |
| JP | 08-304857 | 11/1996 |
| JP | 08-340141 A | 12/1996 |
| JP | 09-167869 A | 6/1997 |
| JP | 10-186424 A | 7/1998 |
| JP | 2002-323636 | 11/2002 |
| JP | 2005-203809 | 7/2005 |
| JP | 10175755 | 5/2006 |
| WO | 87-05118 A1 | 8/1987 |
| WO | 89-10332 A1 | 11/1989 |
| WO | 9315536 | 8/1993 |
| WO | 96/26458 | 8/1996 |
| WO | 97-26571 A2 | 7/1997 |
| WO | 97-21124 A1 | 12/1997 |
| WO | 98-42050 A1 | 9/1998 |
| WO | 0169313 | 9/2001 |

OTHER PUBLICATIONS

L.M. Yang et al, "Upconversion chirped pulse amplification of ultrashort pulses using a multimode Tm:2BLAN fiber", SPIE, vol. 2377, pp. 148-156, Jun. 1995.

A. Galvanauskas et al.,'Generation of femtosecond optical pulses with nanojoule energy from a diode laser and fiber based system,' App. Physics Letters 63, (13) p. 1742 1993.

Galvanauskas et al.: "Compact ultrahigh-power laser systems", SPIE vol. 2377, S- 117-126 Apr. 1995.

Lin et al., Colliding-pulse mode-locked lasers using Er-doped fiber and a semiconductor saturable absorber, Hong Lin, CLEO 1995 paper JTuE1.

U. Griebner et al., "Efficient laser operation with nearly diffraction-limited output from a diode-pumped heavily Nd-doped multimode fiber", Optics Letters, vol. 21, No. 4, Feb. 15, 1996, pp. 266-268.

JPH11-334914-IM-072JP -Office Action translation Dec. 15, 2008.

DE19956739.5-54 72DE Office Action translation Feb. 26, 2009.

DE19961376.8-54 134DE Office Action translation Feb. 6, 2009.

DE19861429.2 IM148DE Office Action translation Mar. 3, 2009.

International Search Report and Written opinion in PCTUS2008074668 dated Jan. 27, 2009—161PCT.

Desthieux et al., "111kW (0.5mJ) pulse amplification at 1.5 m using a gated cascade of three erbium-doped fiber amplifiers" Appl. Phys. Lett., 63(5): 586-588 (Aug. 2, 1993).

Digonnet et al., "1.064- and 1.32-um Nd:YAG Single Crystal Fiber Lasers," Journal of Lightwave Technology, LT-4(4): 454-460 (Apr. 1986).

Gambling et al., "Pulse dispersion for single-mode operation of multimode cladded optical fibres," Electronics Letters, 10 (Mar. 27, 1974).

Haas et al., "A mode-filtering scheme for improvement of the bandwidth-distance product in multimode fiber systems," Journal of Lightwave Technology, 11(7): 1125-1131 (Jul. 1993).

Johnston, "M2 concept characterizes beam quality," Laser Focus World, 173-183 (May 1990).

Minelly et al., "Cladding-pumped fiber laser/amplifier system generating 100 uj energy picosecond pulses," CLEO Technical Digest, 475-476 (May 23, 1997).

Senior, J. Optical Fiber Communications: Principles and Practices, Prentice/Hall International pp. 41-42, 73-76, 138-144 (1985).

Yang, Lih-Mei, "Generation and Amplification of Ultrashort Pulses in Eribium Neodymium and Thulium Fibers," UMI Dissertation Abstracts (1996).

Alcock et al., "Continuous-wave oscillation of a monomode neodymium-doped fibre laser at 0.9 um on the 4 F 3/2-4 I 9/2 transition," Optics Communications, 58(6):405-408 (Jul. 15, 1996).

Alcock et al., "Mode-locking of a neodymium-doped monomode fibre laser," Electronics Letters, 22(5): 268-269 (Feb. 27, 1986).

Alcock et al., "Q-switched operation of a neodymium-doped monomode fibre laser," Electronics Letters, 22(2): 84-85 (Jan. 16, 1986).

Arbore et al. "Frequency doubling of femtosecond erbium-fiber soliton lasers in periodically poled lithium niobate," Optics Letters, 22(1): 13-15 (Jan. 1, 1997).

Bergh et al. "An overview of fiber-optic gyroscopes," Journal of Lightwave Technology, LT-2(2): 91-107 P103 (Apr. 1984).

Cordova-Plaza et al., "Low threshold miniature Q-switched Nd:MgO:LINbO3 laser," OSA Annual Meeting: Digest of Technical Papers and Postdeadline Papers FD6 (Oct. 1996).

Dennis et al., "2-W upconversion laser in Tm:ZBLAN fiber," CLEO Techical Digest, 8: 41 (May 9, 1994).

Desurvire et al., "Low-threshold synchronously pumped all-fiber ring raman laser," Journal of Lightwave Technology LT-5(1): 89-96 (Jan. 1987).

Digonnet et al., "Clad Nd:YAG fibers for laser applications," Journal of Lightwave Technology, LT-5(5): 642-646 (May 1987).

Digonnet, "Passive and Active fiber optic components," Dissertation (Sept. 1983).

Eisenstein et al., "High-power extended-cavity laser at 1.3 um with a single-mode fiber output port," Appl. Phys. Lett., 50(22): 1567-1568 (Jun. 1, 1987).

Fermann et al., "Fiber-lasers for ultrafast optics," Applied Physics B: Lasers and Optics, B 65(2): 259-275 (Aug. 1997).

Fermann et al., "Frequency doubling of Er-doped multi-mode fiber compressor-amplifiers," CLEO Technical Digest, 6: 189-190 (May 5, 1998).

Fermann et al., "High-power single-mode fiber amplifers using multimode fibers" OFC Technical Digest, 2: 39-40 (Feb. 1998).

Fermann et al., "Ultrawide Tunable Er Soliton Fiber Laser Amplified in Yb-Doped Fiber," Optics Letters, 24(20): 1428-1430 (Oct. 15, 1999).

Galvanauskas et al., "Fiber-laser-based femtosecond parametric generators and amplifiers," CLEO Technical Digest, 344-345 (May 22, 1997).

Galvanauskas et al., "High-energy high-average-power femtosecond fiber system using a QPM-grating pulse compressor," CLEO Technical Digest, 6: 364 (May 7, 1998).

Gambling, et al., "Mode conversion coefficients in optical fibers," Applied Optics, 14(7): 1538-1542 (Jul. 1975).

Gapontsev et al., "25 kW peak power, wide-tuneable-repetition-rate and pulse duration eye-safe MOPFA laser," CLEO Technical Digest, 209-210 (May 1996).

Giles et al., "Modeling erbium-doped fiber amplifiers," Journal of Lightwave Technology, 9(2): 271-283 (Feb. 1991).

Gloge, "Optical power flow in multimode fibers," Bell System Technical Journal, 51(8): 1767-1783 (Oct. 1972).

Griebner et al., "Efficient laser operation with nearly diffraction-limited output from a diode-pumped heavily Nd-doped multimode fiber," Optics Letters, 21(4): 266-268 (Feb. 15, 1996).

Harter et al., "Alexandrite-laser-pumped Cr 3+:LiSrAlF6," Optics Letters, 17(21): 1512-1514 (Nov. 1, 1992).

Tajima, "Er3+-Doped single-polarisation optical fibres," Electronics Letters, 26(18): 1498-1499 (Aug. 30, 1990).

Jauncey et al., "Efficient diode-pumped CW and Q-switched single-mode fibre laser," Electronics Letters, 22(4): 198-199 (Feb. 13, 1986).

Keck, Spatial and temporal power transfer measurements on a low-loss optical waveguide, Applied Optics, 13(8): 1882-1888 (Aug. 1974).

Koester et al., "Amplification in a fiber laser," Applied Optics, 3(10): 1182-1186 (Oct. 1964).

Koplow et al., "Single-mode operation of a coiled multimode fiber amplifier," Optics Letters, 25(7): 442-444 (Apr. 1, 2000).

Lee et al., "Simple side coupler for coupling between laser diode and single-mode optical fiber," Applied Optics, 26(12): 2294-2296 (Jun. 15, 1987).

Luther-Davies et al., "Single-mode resonator incorporating an internal multimode optical fiber and a phase-conjugate reflector," JOSA B: Optical Physics, 7(7): 1216-1220 (Jul. 1990).

Marcuse, D., Theory of Dielectric Optical Waveguides, Academic Press, Inc., New York and London, pp. 238-239 (1974).

Morkel et al. "Theoretical modeling of erbium-doped fiber amplifiers with excited-state absorption," Optics Letters, 14(19): 1062-1064 (1989).

ISO 11146-1, "Lasers and laser-related equipment Test methods for laser beam widths, divergence angles and beam propagation ratios—Part 1: Stigmatic and simple astigmatic beams" (2005).

Nakano et al., "Partially coherent light generated by using single and multimode optical fibers in a high-power Nd: glass laser system," Applied Physics Letters, 63(5): 580-582 (1993).

Nelson et al., "Efficient frequency doubling of a femtosecond fiber laser," Optics Letters, 21(21): 1759-1761 (Nov. 1996).

Nilsson et al., "Yb 3+-ring-doped fiber for high-energy pulse amplification," Optics Letters, 22(14): 1092-1094 (Jul. 1997).

Nisoli et al., "Generation of high-energy 10-fs pulses by a new pulse compression technique," CLEO Technical Digest, 9: 189-190 (Jun. 1996).

Nykolak et al., "An Erbium-doped Multimode optical fiber amplifier," Photonics Technology Letters, 3(12): 1079-1081 (Dec. 1991.).

Olshansky, R., "Distortion losses in cabled optical fibers," Applied Optics, 14(1): 20-21 (Jan. 1975).

Olshansky, R., "Mode coupling effects in graded-index optical fibers," Applied Optics, 14(4): 935-945 (Apr. 1975).

Poole et al., "Fabrication of low-loss optical fibres containing rare-earth ions," Electronics Letters, 21(17): 737-738 (Aug. 1985).

Ripin et al., "High efficiency side-coupling of light into Optical fibers using imbedded V-Groves," Electronics Letters, 31(25): 2204-2205 (1995).

Sakaguchi et al., "Power coupling from laser diodes into single-mode fibres with quadrangular pyramid-shaped hemiellipsoidal ends," Electronics Letters, 17(12): 425-426 (Jun. 1981).

Shaklan, S., "Measurement of Intermodal coupling in weakly multimode fibre optics," Electronics Letters, 26(24): 2022-2024 (Nov. 1990).

Bergh et al., "All-single-mode fiber-optic gyroscope with long-term stability," Optics Letters, 6(10): 502-504 (Oct. 1981).

Siegman, A.E., "Defining, measuring, and optimizing laser beam quality," SPIE, 1868: 2-12.

Siegman, A.E., "New developments in laser resonators," SPIE, 1224: 2-14 (1990).

Snitzer, E., "Fibre lasers and dispersion in fibres," First European Electro-Optics Markets Technology Conference, Geneva, Sep. 13-15, 1972, IPC Science and Technology Press: 374-378 (1973).

Snitzer, E., "Proposed fiber cavities for optical masers," JOAP, 32(1): 36-39 (Jan. 1961).

Sorin et al., "Evanescent amplification in a single-mode optical fibre," Electronics Letters, 19(20): 820-822 (Sep. 1983).

Sousa et al., "Multimode Er-doped fiber for single-transverse-mode amplification," Applied Physics Letters, 74(11): 1528-30 (Mar. 1999).

Spielmann et al., "Ultrabroadband femtosecond lasers," IEEE J. Quantum Electronics, 30(4): 1100-1114 (Apr. 1994).

Stokes et al., "All-single-mode fiber resonator," Optics Letters, 7(6): 288-290 (Jun. 1982).

Stone et al., "Self-contained LED-Pumped single-crystal Nd: YAG fiber laser," Fiber and Integrated Optics, 2(1): 19-46 (1979).

Strasser et al., "Reflective-mode conversion with UV-Induced phase gratings in two-mode fiber," OFC'97 Technical Digest: 348-349 (1997).

Sumida et al., "Lens coupling of laser diodes to single-mode fibers," Journal of Lightwave Technology, LT-2(3): 305-311 (Jun. 1984).

Tamura et al., "Optimization of Filtering in soliton fiber lasers," Photonics Technology Letters, 6(12): 1433-1435 (Dec. 1994). N.

Taverner et al., "158-J pulses from a single-transverse-mode, large-mode-area erbium-doped fiber amplifier," Optics Letters, 22(6): 378-380 (Mar. 1997).

Taverner et al., "Generation of high-energy pulses using a large-mode-area erbium-doped fiber amplifier," CLEO '96 Technical Digest: 496-497 (1996).

Walton et al., "Broad-bandwidth pulse amplification to the 10-J level in an ytterbium-doped germanosilicate fiber," Optics Letters, 21(14): 1061-1063 (Jul. 1996).

Yamada et al., "First-order quasi-phase matched LiNbO3 waveguide periodically poled by applying an external field for efficient blue second-harmonic generation," Appl. Phys. Lett, 62(5): 435-436 (Feb. 1993).

Yang et al., "Chirped-pulse amplification of ultrashort pulses with a multimode TM:ZBLAN fiber upconversion amplifier," Optics Letters, 20(9): 1044-1046 (May 1995).

United States Patent Office Action, dated Nov. 3, 2004, U.S. Appl. No. 10/424,220 and Response filed by Applicant, dated Jan. 18, 2005, including 1.111 Amendment, 1.132 Declaration and Information Disclosure Statement.

Declaration of Emily Florio in Support of Ex Parte Request for Reexamination of U.S. Patent No. 5,818,630, executed on Mar. 12, 2008.

Encyclopedia of Laser Physics and Technology, http://www.rp-photonics.com/fiber$_{13}$ coupled_diode_lasers.html, accessed Nov. 21, 2007.

E-mail sent to Cheryl Forrest from Rebecca Wedl of the Stanford Physics Library on Nov. 15, 2007.

Response to a Decision Sua Sponte Vacating Ex Parte Reexamination Filing Date, filed Mar. 12, 2008 in the reexamination of U.S. Patent No. 5,818,630.

Deposition of Lih-Mei Yang, taken Thursday, Feb. 14, 2008.

Berdague et al., "Mode division multiplexing in optical fibers," Applied Optics, 21(11): 1950-1955 (Jun. 1, 1982).

Desthieux et al., "111kW (0.5mJ) pulse amplification at 1.5 m using a gated cascade of three erbium-doped fiber amplifiers" Appl. Phys. Lett., 63(5): 586-588 (Aug. 2, 1993).

Desthieux et al., "Generation of 111kW (0.5mJ) Pulses at 1.5mm Using a Gated Cascade of Three Fibre Amplifiers," P2.13: 329-332. (1990).

Desurvire et al., "Design optimization for efficient erbium-doped fiber amplifiers," Journal of Lightwave Technology, 8(11): 1730-1740 (Nov. 1990).

Digonnet et al., "Nd: YAG single crystal fiber lasers," Second European Conference on Integrated Optics (Oct 1983).

Dominic et al., "110 W fiber laser," *Technical Digest: CLEO*, CPD11-1-CPD11-2 (May 23-28, 1999).

Fermann et al., "Cladding-Pumped Passively Mode-locked femtosecond fiber lasers," *CLEO*, CFD1: 493-494 (1996).

Fermann et al., "Environmentally stable Kerr-type mode-locked erbium fiber laser producing 360-fs pulses," Optics Letters, 19(1): 43-45 (Jan. 1, 1994).

Fermann et al., "High-power single-mode fiber amplifers using multimode fibers" OFC Technical Digest, 2: 39-40 (Feb. 1998).

Fermann et al., "Fiber-lasers for ultrafast optics'" Applied Physics B, 63(2): 259-275 (Aug. 1997).

Fermann et al., "Ultrafast pulse sources based on mutt-mode optical fibers," Applied Physics B, 70 [Suppl.]: S13-S23 (2000).

Fermann, "Single-mode excitation of multimode fibers with ultrashort pulses," Optics Letters, 23(1): 52-54 (Jan. 1, 1998).

Gambling at al., "Mode Excitation in a multimode optical-fibre waveguide," Electronics Letters, 9(18): 412-414 (Sep. 6, 1973).

Gapontsev et al., "3W saturation power polarisation maintaining 1060 nm ytterbium fiber amplifier," SPIE, 3615: 264-268 (Jan. 1999).

Griebner et al., "Efficient laser operation with nearly diffraction-limited output from a diode-pumped heavily Nd-doped multimode fiber," Optics Letters, 21(4): 266-268 (Feb. 15, 1996).

Hofer et al., "Characterization of Ultrashort Pulse Formation in Passively Mode-Locked Fiber Lasers," IEEE J. of Quantum Electronics, 28(3): 720-728 (Mar. 1992).

Imasaka, "Optical Chromatography. A new tool for separation of particles," Analusis Magazine, 26(5): M 53-M 55 (1998).

IPG Manual, Draft Specification: Ytterbium pulsed fiber laser Model YLP—10/400/20/200, IPG Lasers.

Jedrzejewski et al., "Tapered-Beam Expander for Single-Mode Optical-Fiber Gap Devices," Electroincs Letters, 22(2): 105-106 (Jan. 1986).

Kaiser, P. & D. Keck, selection from Optical Fiber Telecommunications II, 42-45.

Marsico at al., "Laser Welding of lightweight Structural Steel Panels," ICALEO 444-452 (1993).

Mears et al., "Neodymium-doped silica single-mode fibre lasers," Electronics Letters, 21(17): 738-740 (Aug. 15, 1985).

Millar et al., "Single transverse mode operation at 1345 nm wavelength of a diode-laser pumped neodymium-ZBLAN multimode fiber laser," IEEE Photonics Technology Letters, 2(6): 415-417 (Jun. 1990).

Mortimore et al., "Low-Loss Joints between Dissimilar Fibres by Tapering fusion splices," Electronics Letters, 22(6): 318-319 (Mar. 13, 1986).

Nilsson et al., "Modeling and optimization of low-repetition-rate high-energy pulse amplification in cw-pumped erbium-doped fiber amplifiers," Optics Letters, 18(24): 2099-2101 (Dec. 15, 1993).

Nykolak et al., "An Erbium-doped Multimode optical fiber amplifier," Photonics Technology Letters, 3(12): 1079-1081 (Dec. 1991).

Ober et al., "42-fs pulse generation from a mode-locked fiber laser started with a moving mirror," Optics Letters, 18(5): 367-369 (Mar. 1, 1993).

Ober et al., "Widely tunable femtosecond neodymium fiber laser," Optics Letters, 20(22): 2303-2305 (Nov. 15, 1995).

Offerhaus et al., "High energy single-transverse-mode Q-switched fiber laser based on a multimode large-mode-area erbium-doped fiber," Optics Letters, 23(21): 1683-1685 (Nov. 1, 1998).

O'Neill et al., "High Power High Brightness Industrial Fiber laser Technology," ICALEO (2004).

Opinion rendered for SPI Lasers, Fulbright & Jaworski L.L.P. (Mar. 2, 2006).

Overton, "Fiber Laser Forum gets heated," Industrial Laser Solutions.

Poole et al., "Optical Fiber-Based Dispersion Compensation Using Higher Order Modes Near Cutoff," Journal of Lightwave Technology, 12(10): 1746-1758 (Oct. 1994).

Refi et al., "Optical Fibers for Optical Networking," Bell Labs Technical Journal (Lucent Technologies), 246-261 (Jan.-Mar. 1999).

Richardson et al., "Fiber laser systems shine brightly," Laser Focus World, 33(9): 87-96 (Sep. 1997).

Ross, et al., "Optical amplification of 1.06-u InAs1-xPx Injection-laser emission," IEEE J. of Quantum Electronics, QE-6(6): 361-366 (Jun. 1970).

Sakaguchi et al., "Power coupling from laser diodes into single-mode fibres with quadrangular pyramid-shaped hemiellipsoidal ends," Electronics Letters, 17(12): 425-426 (Jun. 1981).

Siegman, A.E., "New developments in laser resonators," SPIE, 1224: 2-14 (1990).

Snitzer, "Fibre lasers and dispersion in fibres," First European Electro-Optics Markets Technology Conference, Geneva, Sep. 13-15, 1972, IPC Science and Technology Press: 374-378 (1973).

Snitzer, "Glass Lasers," Applied Optics, 5(10): 1487-1499 (Oct. 1966).

Snitzer, E., "Proposed fiber cavities for optical masers," JOAP, 32(1): 36-39 (Jan. 1961).

Sorin et al., "Evanescent amplification in a single-mode optical fibre," Electronics Letters, 19(20): 820-822 (Sep. 1983).

Sorin et al., "Highly selective evanescent modal filter for two-mode optical fibers," Optics Letters, 11(9): 581-583 (Sep. 1986).

Stock et al., "Chirped pulse amplification in an erbium-doped fiber oscillator/erbium-doped fiber amplifier system," Optics Communication, 106: 249-252 (1994).

Stock et al., "Generation of high-power femtosecond optical pulses by chirped pulse amplification in erbium doped fibers," Nonlinear Guided-Wave Phenomena, Technical Digest, 15: PD5-1-PD53 (Sep. 1993).

Stock, "Generation and amplification of Ultrashort pulses in erbium-doped optical fibers," U. of Michigan Dissertation (1994).

Stock et al., "Synchronous mode locking using pump-induced phase modulation," Optics Letters 18(18): 1529-1531 (Sep. 15, 1993).

Stokes et al., "All-single-mode fiber resonator," Optics Letters, 7(6): 288-290 (Jun. 1982).

Stone et al., "Neodymium-doped silica lasers in end-pumped fiber geometry," Applied Physics Letters, 23(7): 388-389 (Oct. 1973).

Stone et al., "Self-contained LED-Pumped single-crystal Nd: YAG fiber laser," Fiber and Integrated Optics, 2(1): 19-46 (1979).

Strasser et al., "Reflective-mode conversion with UV-Induced phase gratings in two-mode fiber," OFC '97 Technical Digest: 348-349 (1997).

Sumida et al., "Lens coupling of laser diodes to single-mode fibers," Journal of Lightwave Technology, LT-2(3): 305-311 (Jun. 1984).

Tamura et al., "Optimization of Filtering in soliton fiber lasers," Photonics Technology Letters, 6(12): 1433-1435 (Dec. 1994).

Taverner et al., "158-µJ pulses from a single-transverse-mode, large-mode-area erbium-doped fiber amplifier," Optics Letters, 22(6): 378-380 (Mar. 1997).

Taverner et al., "Generation of high-energy pulses using a large-mode-area erbium-doped fiber amplifier," CLEO '96 Technical Digest: 496-497 (1996).

Yang et al., "Chirped-pulse amplification of ultrashort pulses using Neodymium- and Erbium-doped fiber amplifiers," Ultrafast Phenomena IX, 197-189 (1994).

Yang et al., "Chirped-pulse amplification of ultrashort pulses with a multimode TM:ZBLAN fiber upconversion amplifier," Optics Letters, 20(9): 1044-1046 (May 1995).

Yang, Lih-Mei, "Generation and Amplification of Ultrashort Pulses in Eribium Neodymium and Thulium Fibers," UMI Dissertation Abstracts (1996).

Yang et al., "Upconversion chirping pulse amplification of ultrashort pulses using a multimode Tm:2BLAN fiber," SPIE, 2377: 148-156 (Jun. 1995).

Yang et al., "Upconversion chirping pulse amplification in a multimode Tm:ZBLAN fiber and temporally resolved modal analysis," CLEO '95 Techival Digest: 6-7 (1995).

Yang et al., "Upconversion Multimode Fiber Amplifier," Ultrafast Pulse 2(2): 1-2 (1995).

Yapp et al., "Hybrid Laser-Arc Pipeline Welding".

YLR-LP Series: 10 to 500W single mode linearly polarized ytterbium fiber lasers, IPG Photonics.

YLR-SM Series: 100kW to 1.5W CW single mode Yb fiber laser systems—Industrial 19" Rack-Mounted Units, IPG Photonics.

Yoda et al., "Beam quality factor of higher order modes in a step-index fiber," Journal of Lightwave Technology, 24(3): 1350-1355 (2006).

Zenteno et al., "Frequency-modulated cavity-dumped Nd-doped fiber laser," Optics Letters, 16(5): 315-317 (Mar. 1, 1991).

U.S. Appl. No. 09/785,944 Fermann Partial file history of U.S. Appl. No. 09/199,278 and U.S. Appl. No. 09/785,944.

U.S. Appl. No. 09/809,248 Fermann Partial file history of U.S. Appl. No. 09/809,248.

U.S. Appl. No. 10/424,220 Fermann Partial file history of U.S. Appl. No. 10/424,220.

U.S. Appl. No. 10/850,509 Fermann Partial file history of U.S. Appl. No. 10/850,509.

U.S. Appl. No. 11/109,711 Fermann Partial file history of U.S. Appl. No. 11/109,711.

US6275512 Fermann Partial file history of U.S. Patent 6,275,512.

IRE-Polis marketing lit—IPGI 12293-12301.

IRE-Polis marketing lit—IPGI 12302-12318.

IRE-Polis marketing lit—IPGI 12319-12335.

IRE-Polis marketing lit—IPGI 12336-12413.

Complaint for Patent Infringement and Exhibit A (U.S. Patent 5,818,630 & Civil Cover Sheet).

Nov. 16, 2006 Complaint for Patent Infringement and Exhibit A (U.S. Patent 5,818,630 & Civil Cover Sheet).

Dec. 22, 2006 IMRA's First Amended Complaint for Patent Infringement.

Jan. 9, 2007 Defendant IPG Photonics Corporation's Answer, Affirmative Defenses, Counterclaims and Jury Demand.

Feb. 1, 2007 Plaintiff IMRA America, Inc.'s Answer to Counterclaims of Defendant IPG Photonics Corporation.

Feb. 28, 2007 Plaintiff's First Set of Interrogatories to Defendant (Nos. 1-12).

Feb. 28, 2007 Plaintiff's First Set of Requests for Production of Documents and Things to Defendant (Nos. 1-98).

Mar. 19, 2007 Defendant IPG Photonics Corporation's First Set of Interrogatories (Nos. 1-13).

Mar. 19, 2007 Defendant IPGP Photonics Corporation's First Set of Requests for Production of Documents and Things (Nos. 1-84).

Mar. 30, 2007 Defendant IPG Photonics Corporation's Responses to Plaintiff IMRA America, Inc.'s First Set of Interrogatories (Nos. 1-12).

Mar. 30, 2007 Defendant's Responses to Plaintiff's First Set of Requests for Production of Documents and Things (Nos. 1-98).

Apr. 18, 2007 Plaintiff IMRA America, Inc.'s Responses to Defendant IPG Photonics Corporation's First Set of Interrogatories (Nos. 1-13).

Apr. 18, 2007 Plaintiff IMRA America, Inc.'s Responses to Defendant IPG Photonics Corporation's First Set of Requests for Production of Documents and Things (Nos. 1-84).

Jun. 20, 2007 Stipulated Protective Order and Exhibit A (Confidentiality Agreement).

Jul. 2, 2007 Signed Stipulated Protective Order and Exhibit A (Confidentiality Agreement).

Sep. 27, 2007 IPG's Subpoena to Lih-Mei Yang.

Oct. 22, 2007 Defendant's Responses to Plaintiff's Second Set of Requests for Production of Documents and Things (Nos. 99-182).

Nov. 16, 2007 Defendant IPG Photonics Corporation's Supplemental Interrogatory Response to Interrogatory No. 2.

Nov. 21, 2007 Plaintiffs First Supplemental Responses to Defendant's Interrogatory Nos. 2, 5 and 6.

Dec. 13, 2007 Plaintiff's Second Supplemental Response to Defendant's Interrogatory No. 5.

Dec. 14, 2007 IPG's Subpoena to Almantas Galvanauskas.

Dec. 19, 2007 Defendants IPG Photonics Corporation's Second Set of Requests for Production of Documents and Things (Nos. 85-88).

Dec. 21, 2007 Expert Report of Martin J Adelman with Exhibits A-C.

Dec. 21, 2007 Defendant IPG Photonics Corporation's Motion to Stay the Litigation Pending Reexamination.

Dec. 21, 2007 Exhibit 1 to Defendant IPG Photonics Corporation's Motion to Stay the Litigation Pending Reexamination—Defendant IPG Photonics Corporation's First Set of Interrogatories (Nos. 1-13).

Dec. 21, 2007 Exhibit 2 to Defendant IPG Photonics Corporation's Motion to Stay the Litigation Pending Reexamination—Plaintiff IMRA America, Inc.'s Responses to Defendant IPG Photonics Corporation's First Set of Interrogatories (Nos. 1-13).

Dec. 21, 2007 Exhibit 3 to Defendant IPG Photonics Corporation's Motion to Stay the Litigation Pending Reexamination—Plaintiffs First Supplemental Responses to Defendant's Interrogatory Nos. 2, 5, and 6.

Dec. 21, 2007 Exhibit 5 to Defendant IPG Photonics Corporation's Motion to Stay the Litigation Pending Reexamination—Request for Ex Parte Reexamination Transmittal Form.

Dec. 27, 2007 IPG's Notice of Deposition and Subpoena to Richard Turner.

Dec. 27, 2007 IPG's Subpoena to Sughrue Mien, PLLC.

Dec. 27, 2007 Defendant IPG Photonics Corporation's Supplemental Interrogatory Responses to Interrogatory Nos. 2, 4, 5, 7 and 9.

Dec. 28, 2007 Plaintiff's 30(b)(6) Notice of Deposition of IPG Photonics Corporation Regarding Liability with Exhibit A.

Jan. 4, 2008 Plaintiff IMRA America, Inc.'s Opposition to Defendant's Motion to Stay the Litigation Pending Reexamination.

Jan. 4, 2008 Exhibit A to Plaintiff IMRA America, Inc.'s Opposition to Defendant's Motion to Stay the Litigation Pending Reexamination—Nov. 21, 2006 LoPresti Letter to Harter (redacted).

Jan. 4, 2008 Exhibit B to Plaintiff IMRA America, Inc.'s Opposition to Defendant's Motion to Stay the Litigation Pending Reexamination—Defendant IPG Photonics Corporation's Responses to Plaintiff IMRA America, Inc.'s First Set of Interrogatories (Nos. 1-13).

Jan. 4, 2008 Exhibit E to Plaintiff IMRA America, Inc.'s Opposition to Defendant's Motion to Stay the Litigation Pending Reexamination.

Jan. 14, 2008 Defendant IPG Photonics Corporation's Second Set of Interrogatories (Nos. 14-20).

Jan. 14, 2008 Defendant IPG Photonics Corporation's Third Set of Requests for Production of Documents and Things (No. 89).

Jan. 16, 2008 Plaintiff IMRA America, Inc.'s Second Set of Interrogatories to Defendant IPG Photonics Corporation (Nos. 13-18).

Jan. 16, 2008 Plaintiff IMRA America, Inc.'s Third Set of Requests for Production of Documents and Things to Defendant IPG Photonics Corporation (Nos. 183-241).

Jan. 18, 2008 Plaintiff's Response to Defendant's Second Set of Requests for Production of Documents and Things (Nos. 85-88).

Jan. 18, 2008 IPG's Subpoena to MIT.

Jan. 27, 2008 Rebuttal Expert Report of Hon. Lawrence J. Goffney, Jr. with Appendices A & B.

Feb. 15, 2008 Defendant IPG Photonics Corporation's Responses to Plaintiff IMRA America, Inc.'s Second Set of Interrogatories (Nos. 13-18).

Feb. 15, 2008 Defendant IPG Photonics Corporation's Responses to Plaintiff's Third Set of Requests for Production of Documents and Things (Nos. 183-240).

Feb. 15, 2008 Exhibit E to Plaintiff's Brief in Support of its Motion to Compel Production of Documents and an In-Person Inspection of Defendant's Electronically Stored Documents—Defendant's Responses to Plaintiff's Second Set of Requests for Production of Documents and Things (Nos. 99-182).

Declaration (Apr. 25, 2003) '547 published application.

Preliminary Amendment (May 27, 2003). filed in '547 published application.
Preliminary Amendment (Jun. 10, 2003) filed in '547 published application.
Office Action, (Nov. 19, 2003) issued in '547 published application.
Response (Jan. 26, 2004) filed in '547 published application.
Notice of Allowability (Apr. 27, 2004) issued in '547 published application.
Preliminary Amendment (May 20, 2004) filed in '547 published application.
Office Action (Nov. 3, 2004) issued in '547 published application.
Response (Jan. 21, 2005) filed in '547 published application.
Rule 132 Declaration (Jan. 21, 2005) filed in '547 published application.
Office Action (May 17, 2005) issued in '547 published application.
Interview Summary (Jun. 30, 2005) Issued in '547 published application.
Amendment (Aug. 22, 2005) filed in '547 published application.
Office Action (Dec. 20, 2005) issued in '547 published application.
Response (Jan. 12, 2006) filed in '547 published application.
Rule 132 Declaration, (Jan. 12, 2006) filed in '547 published application.
Information Disclosure Statement (Jan. 30, 2006) filed in 'published application.
Notice of Allowability dated May 26, 1998 (Patent No. 5,818,630).
Declaration (Feb. 16, 2001) '944 published application.
Valentin P. Gapontsev et al; "3W Saturation Power Polarisation Maintaining 1060nm Ytterbium Fiber Amplifier", SPIE, vol. 3815, Nov. 2, 2006, pp. 264-268.
Martin E. Fermann, "Amended Appeal Brief Submitted in Response to notification of Non-Compliant Appeal Brief Dated Mar. 24, 2008", Sep. 23, 2008, pp. 1-123, in U.S. Appl. No. 09/785,944.
Martin E. Fermann, Final Office Action, Jun. 7, 2007, pp. 1-20, in U.S. Appl. No. 09/785,944.
"Advanced and Proven Technology", IRE-Polus Group, No. 5455, 1996, pp. 1-5.
"Pulsed Ytterbium Fiber Laser", Model YLPM-3000, IRE-Polus Group, No. 5455, 1996, pp. 1-2.
"Pulsed Single Mode Ytterbium Fiber Laser", YLP-Series, IRE-Polus Group, No. 5455, 1996, pp. 1-2.
"High Power Single-Mode CW Ytterbium Fiber Laser Module", Model PYL-8000M-1047, IRE-Polus Group, No. 5455, 1996, pp. 1-2.
"Single-Mode Ytterbium Fiber Laser", Model YLD-2000-1030, IRE-Polus Group, No. 5455, 1996, pp. 1-2.
"High Power Single-Mode CW Ytterbium Fiber Laser Module", Model PYL-5000M, IRE-Polus Group, No. 5455, 1996, pp. 1-2.
"Single-Mode Ytterbium Fiber Laser Module", Model YLM-1000A-1030 (1047), IRE-Polus Group, No. 5455, 1996, pp. 1-2.
"Single-Mode High Power Ytterbium Fiber Lasers", PYL-Series, IRE-Polus Group, No. 5455, 1996, pp. 1-2.
"Single-Mode Ytterbium Fiber Laser", Model YL-Series, IRE-Polus Group, No. 5455, 1996, pp. 1-3.
"Tunable ErbiumFiber Laser", Model ELT-100, IRE-Polus Group, No. 5455, 1996, pp. 1-2.
"Single-Frequency Erbium Fiber Laser", Model ELD-500BC, IRE-Polus Group, No. 5455, 1996, pp. 1-2.
"Single-Mode CW Erbium Fiber Laser", Model ELD 5000, IRE-Polus Group, No. 5455, 1996, pp. 1-2.
"Single-Mode Eribum Fiber Laser", EL-Series, IRE-Polus Group, No. 5455, 1996, pp. 1-3.
"Eye-Safe" Pulsed Erbium Fiber Laser, (Bench-Top Version) Model ELPD-1000R, IRE-Polus Group, No. 5455, 1996, pp. 1-2.
"Eye-Safe" Pulsed Erbium Fiber Laser Module, Model ELPM-500R, IRE-Polus Group, No. 5455, 1996, pp. 1-2.
"Diode-Pumped Pulsed Erbium Fiber Laser", Model ELPD-100M "Eye-Safe", IRE-Polus Group, No. 5455, 1996, pp. 1-2.
"Pulsed Erbium Fiber Laser", Model ELPD-100LF, IRE-Polus Group, No. 5455, 1996, pp. 1-2.
"Eye-Safe" Pulsed Erbium Fiber Laser, Model ELPD-1000, IRE-Polus Group, No. 5455, 1996, pp. 1-2.
"Pulsed Erbium Fiber Laser", Model ELPD-200HF, IRE-Polus Group, No. 5455, 1996, pp. 1-2.
Opinion Rendered for SPI Lasers plc, Fulbright & Jaworski L.L.P., Mar. 2, 2006.
Lih-Mei Yang, Generation and Amplification of Ultrashort Pulses in Erbium, Neodymium, and Thulium Fibers, Dissertation Abstracts International, Vol. 57, No. 6, Section B, p. 3823 (Dec. 1996).
B.Desthieux et al, 111kW(0.5 mJ) pulse amplification at 1.5μm using a Gated Cascade of Three Erbium-Doped Fiber Amplifiers, Appl. Phys. Lett. , vol. 63, No. 5, 586-88 (Aug. 2, 1993).
Notice of Allowability dated May 26, 1998 (Patent No. 5,818,630).
Declaration (Apr. 25, 2003) '547 published application.
Declaration (Feb. 16, 2001) '044 published application.
Preliminary Amendment (May 27, 2003) filed in '547 published application.
Preliminary Amendment (Jun. 10, 2003) filed in '547 published application.
D.T. Walton, et al, "Broad-bandwidth pulse amplification to the 10μJ level in an ytterbium-doped germanosilicate fiber", Jul. 15, 1996, vol. 21, No. 14 Optics Letters p. 1061-1063.
S. Berdague et al, Mode Division Multiplexing in Optical Fibers, Applied Optics, vol. 21, No. 11, Jun. 1, 1982, p. 1950-1955.
Craig D. Poole, et al, "Optical Fiber-Based Dispersion Compensatin Using Higher Order Modes Near Cutoff", Journal of Lightwave Tech., vol. 12, No. 10, Oct. 1994, pp. 1746-1758.
Office Action, (Nov. 19, 2003) issued in '547 published application.
Response (Jan. 26, 2004) filed in '547 published application.
Notice of Allowability (Apr. 27, 2004) issued in '547 published application.
Preliminary Amendment(May 20, 2004) filed in '547 published application.
Office Action (Nov. 3, 2004) issued in '547 published application.
Response (Jan. 21, 2005) filed in '547 published application.
Rule 132 Declaration (Jan. 21, 2005) filed in '547 published application.
Office Action (May 17, 2005) issued in '547 published application.
Interview Summary (Jun. 30, 2005) issued in '547 published application.
Amendment (Aug. 22, 2005) filed in '547 published application.
Office Action (Dec. 20, 2005) issued in '547 published application.
M. Fermann, Single-Mode excitation of multimode fibers with ultrashort pulses, Optices Lett., vol. 23, No. 1, pp. 52-54 (Jan. 1, 1998).
Response (Jan. 12, 2006) filed in '547 published application.
Rule 132 Declaration, (Jan. 12, 2006) filed in '547 published application.
Information Disclosure Statement (Jan. 30, 2006) filed in '547 published application.
M. Fermann et al, Fiber-lasers for ultrafast optics, App. Phys. B., vol. 65, 259-275 (1997).

* cited by examiner

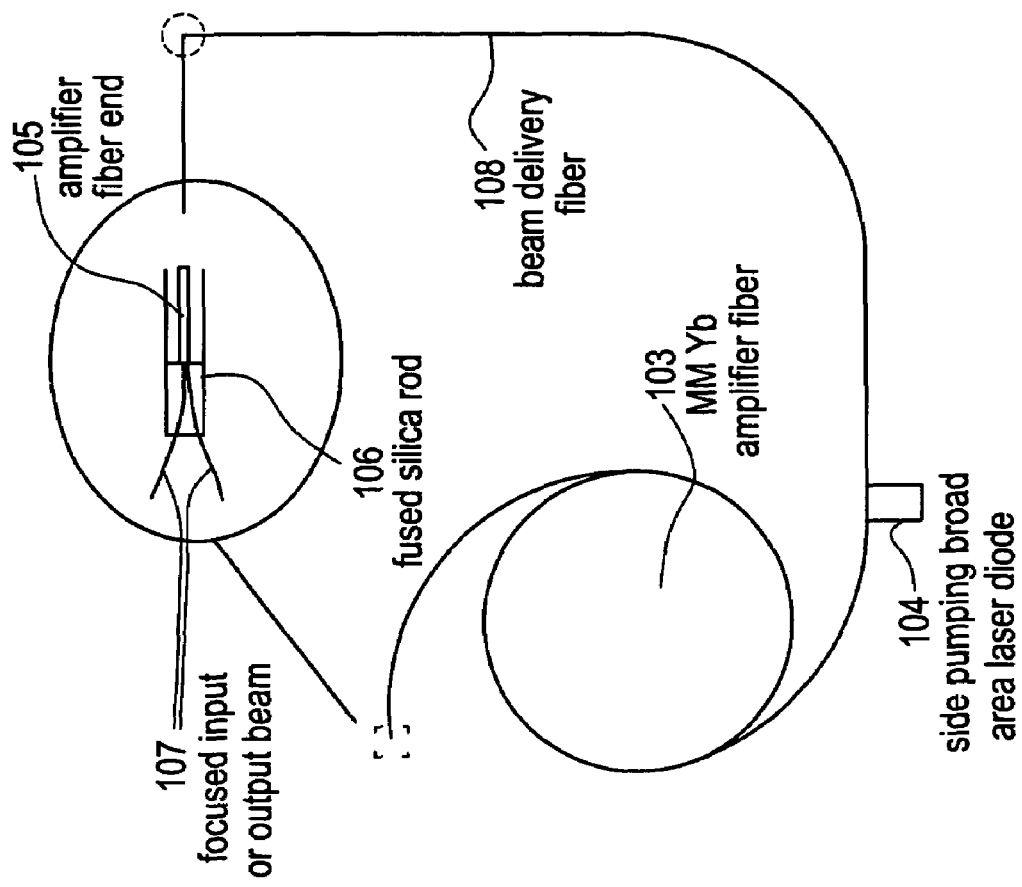
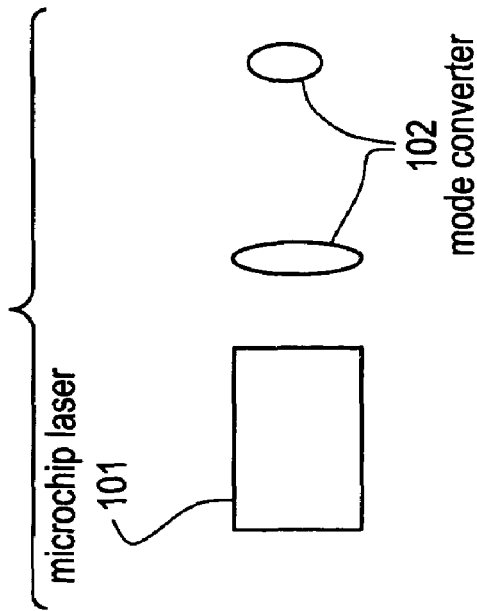

Actively Q-switched micro-laser

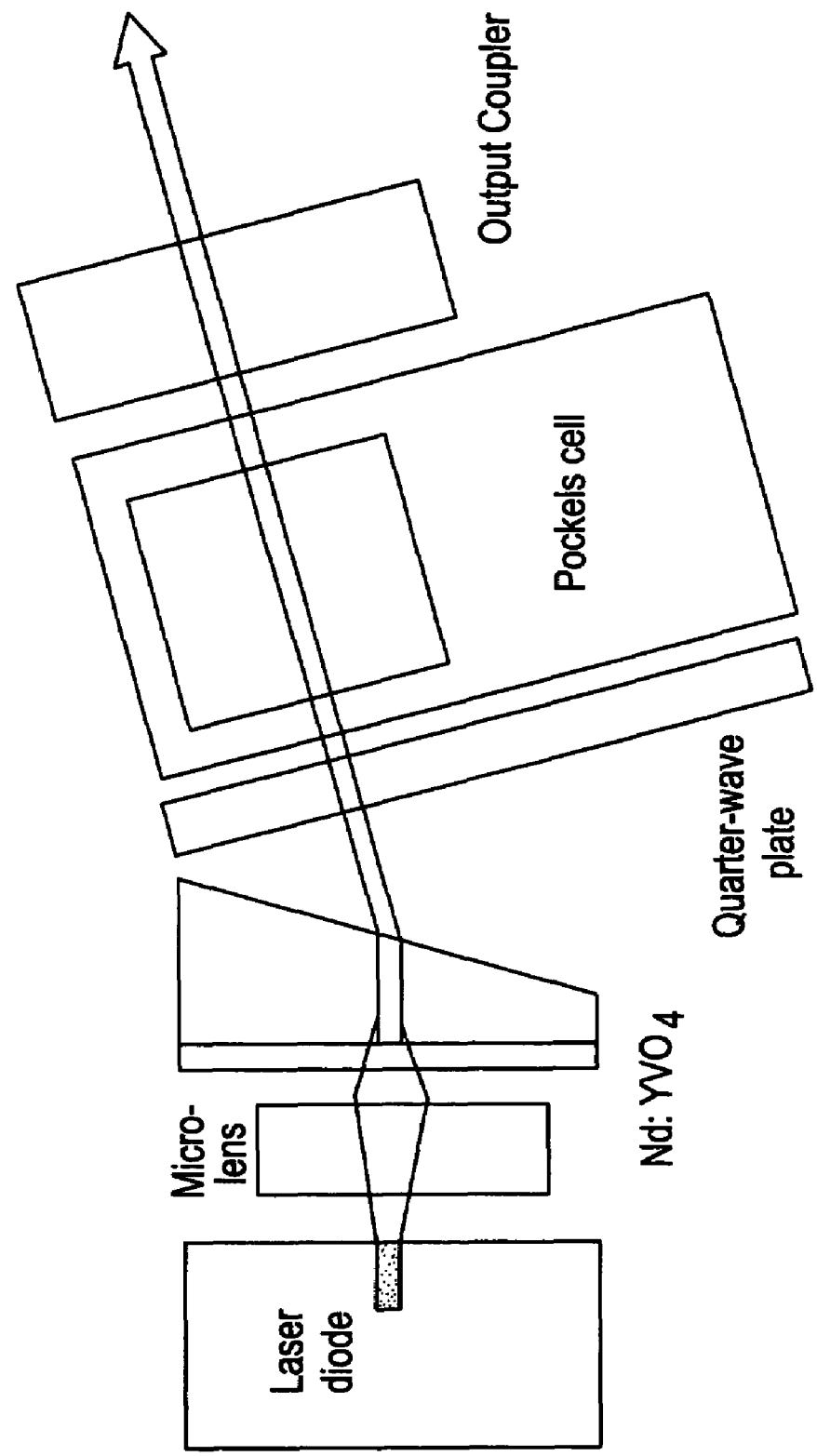

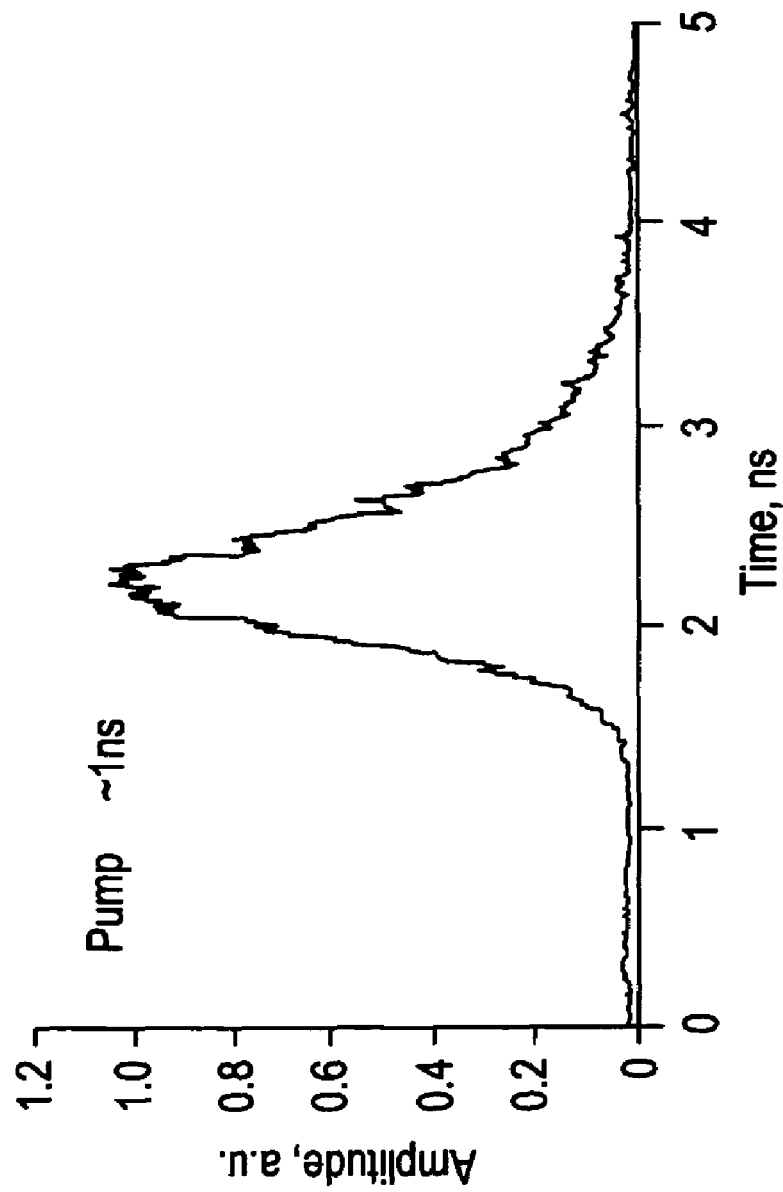

MICROCHIP-YB FIBER HYBRID OPTICAL AMPLIFIER FOR MICRO-MACHINING AND MARKING

This is a Continuation Application of prior application Ser. No. 10/958,593, filed Oct. 6, 2004, now abandoned which is a Continuation of Ser. No. 10/645,662 (Confirmation No. 8431), filed Aug. 22, 2003, now abandoned which is a Continuation of Ser. No. 09/317,221 (Confirmation No.: 8331) filed May 24, 1999 now abandoned of Almantas GALVANAUSKAS, Donald J. HARTER, Martin E. FERMANN and Ferenc RAKSI entitled MICROCHIP-Yb FIBER HYBRID OPTICAL AMPLIFIER FOR MICRO-MACHINING AND MARKING, which is a Continuation-In-Part of U.S. application Ser. No. 09/116,241 filed Jul. 16, 1998, now U.S. Pat. No. 6,208,458, which is a Continuation-in-Part application of U.S. application Ser. No. 08/822,967 filed Mar. 21, 1997, now U.S. Pat. No. 6,181,463, the disclosures of all of which are expressly incorporated by reference herein.

FIELD OF THE INVENTION

This invention relates generally to laser systems having application to such fields as micro-machining, drilling and marking. A primary characteristic of these lasers is their high-powered short-pulsed output, which in, for example, an industrial application, preferably machines the surface of a target or workpiece by an ablation technique. The invention also relates generally to laser systems which can serve in replacement of more expensive Nd based lasers, such as diode-pumped Q-switched Nd:YAG lasers and other lasers using Nd-based materials.

BACKGROUND OF THE INVENTION

It has been known in the prior art to use pulsed laser systems to effect such processes as diverse as metal machining and biological tissue removal. Of chief concern in these systems is the amount of "collateral damage" to the surrounding regions of the workpiece, or, in the case of biological uses, surrounding tissues. In the case of the machining of metallic workpieces, for example, laser pulses greater than 100 microseconds in duration will machine the workpiece at the cost of creating a significant pool of molten liquid which is ejected from the beam impact site. Cleanly machined features cannot be obtained with this machining technique owing to the tendency of the molten material to spatter the workpiece and/or freeze and harden on the workpiece itself. This effect is due, of course, to the transfer of a significant amount of heat into the workpiece material at the target zone and at surrounding areas as well. In the case of biological procedures, this heat transfer effect typically causes unacceptable collateral damage to the surrounding tissues.

A general but partial solution to this problem resides in the use of shorter pulse durations. With shorter pulses the target is heated more quickly and thus reaches the evaporation point before significant liquid is permitted to form. Thus, in this arena, the shorter Q-switched temporal pulse may find advantage in certain applications. The pulse widths of conventional Q-switched, solid state lasers used in micro machining is approximately 50-200 nanoseconds. This pulse width has for many cases proven to provide a reasonable balance between laser cost, machining accuracy and collateral effects such as the size of the heat-affected zone (HAZ), it being generally understood that the cost of laser systems of significant power increases greatly with the shortness of the period of the output pulse.

However, even in the above mentioned pulse width range, the degree of heat transfer into the material is unacceptable for many applications. Recently developed lasers reported at OE/LASE SPIE vol. 2380 pp138-143 (1995) which generate pulses in the 8-20 ns range abate this problem to a degree, however since the threshold for ablation in the nanosecond range decreases as the reciprocal of the square root of the laser temporal pulse width, it is apparent that as the pulsewidth is further reduced, the range of potential applications broadens considerably.

With advances in pulsed laser systems, lasers having pulse widths well into the femtosecond regime have become available. At these ultrashort pulse widths, collateral damage to surrounding regions becomes almost negligible, because of the lack of significant heat transfer into zones outside of the immediate target area. Essentially, the material at the target is substantially instantaneously vaporized while the fleeting duration of the impact of the laser energy substantially eliminates the possibility of heat transfer into surrounding areas. In general, it is known that the heat penetration depth L is proportional to the square root of the product of the heat diffusion coefficient (specific to the material) and the pulse width t. Consequently, as the pulse width becomes shorter, the heat penetration depth decreases proportionately. With femtosecond pulses, ablation thus takes place before significant heat can be transferred into the material, so that little or no heat effected zone (HAZ) is created: U.S. Pat. Nos. 5,656,186 and 5,720,894, incorporated herein by reference, discuss the above effects generally, and disclose laser systems operating well into the femtosecond regime in some instances.

However, as previously mentioned, the costs associated with femtosecond-regime micro-machining lasers are not insignificant; they presently cost five to fifteen times more than the present nanosecond-regime micro-machining sources. Thus, there is a need in the industrial and medical fields for a micro-machining or marking laser which reduces the collateral damage problems of the prior art, yet has a cost comparable to the present sources. This goal has been achieved through the present invention, which, through the use of a novel and highly efficient combination of Q-switching and Yb fiber laser techniques, provides a source operating in the short nanosecond or sub-nanosecond regime which is less expensive than the micro-machining sources now conventionally used, generating pulses as much as 4 orders of magnitude smaller than that in the known micromachining arts, and thus producing a greatly decreased heat affected zone which is practical for a wide variety of applications while avoiding the greatly increased cost of present femtosecond systems.

As mentioned above, Q-switching is currently a common technique for generating nanosecond optical pulses. It is known that the main parameter which determines the duration of a Q-switched laser pulse is the laser cavity round-trip time $T_{round\text{-}trip} = 2L_{cavity}/c$, where c is the speed of light and $L_{cavity}$ is the laser cavity length. Therefore, shorter laser cavity length is generally required for generating shorter Q-switched pulses. However, it is known that this shortening of the cavity length normally reduces the mode volume which makes if more difficult to achieve suitable pulse energies. Further amplification in a solid-state amplifier is usually not a practical solution due to the very low gain characteristic of solid-state amplifiers. Moreover, pushing the energies from a short pulse microchip laser sufficient for micromachining, reduces the microchip laser efficiencies to around 5%.

Here we demonstrate that by using a low energy microchip laser in conjunction with a highly efficient large core Yb fiber amplifier these problems can be overcome and subnanosecond optical pulses can be achieved at high pulse energies.

Known Nd: based lasers, in addition to being expensive, are less efficient compared to Yb-doped fiber amplifiers. For example, Nd:YAG lasers transform the diode pump power to optical output at approximately 50% efficiency. In contrast, Yb fiber amplifiers transform laser diode pump power to optical output with about 90% efficiency. This better efficiency leads to certain cost savings, especially when the comparison is based on cost per unit of output power.

The amplification of high peak-power and high-energy pulses in a diffraction-limited optical beam in single-mode (SM) optical fiber amplifiers is generally limited by the small fiber core size that needs to be employed to ensure SM operation of the fiber. To overcome the energy and peak power limitations, recently the use of multi-mode (MM) fiber amplifiers has been suggested (U.S. Pat. No. 5,818,630 to Fermann and Harter, herein incorporated by reference). In this work the loss of spatial beam quality in MM fiber amplifiers is prevented by excitation of the fundamental mode via the use of appropriate mode-matching bulk optics or fiber tapers as suggested in U.S. Ser. No. 09/199,728 to Fermann et al., herein incorporated by reference.

Particularly interesting are MM fiber amplifiers that are double-clad since they can be conveniently pumped with high-power diode lasers to produce high average powers. Moreover, the achievable small cladding/core ratio in double-clad MM fibers also allows the efficient operation of fiber lasers with small absorption cross sections, as suggested in the aforementioned U.S. Pat. No. 5,818,630 to Fermann and Harter.

Cladding-pumped fiber amplifiers and lasers have been known for many years. See U.S. Pat. No. 4,829,529 to J. D. Kafka, U.S. Pat. No. 4,815,079 to Snitzer et al., U.S. Pat. No. 5,854,865 to Goldberg, U.S. Pat. No. 5,864,644 to DiGiovanni et al., and U.S. Pat. No. 5,867,305 to Waarts et al. In the early work in this area (Kafka and Snitzer) only double-clad fiber amplifiers comprising a SM core were considered for cladding-pumping, resulting in obvious limitations for the amplification of high peak power pulses. Moreover, Snitzer et al. only considered double clad fibers with approximately rectangular-shaped or non-centrosymmetric cladding cross sections to optimize the absorption efficiency of such fibers. The use of relatively small cladding/core area ratios enabled by double-clad fibers with a large multi-mode core, however, allows for the efficient implementation of any arbitrary cladding cross section, i.e. circular, circular with an offset core, rectangular, hexagonal, gear-shaped, octagonal etc. The work by Kafka was equally restrictive in that it only considered double-clad fibers with a single-mode core pumped with coherent pump diode lasers. Again the use of relatively small cladding/core area ratios enabled by double-clad fibers with a large multi-mode core enables the efficient implementation of pump diode lasers with any degree of coherence.

The later work of Goldberg and DiGiovanni was not necessarily restricted to the use of double-clad fibers with SM fiber cores. However, none of the work by Goldberg and DiGiovanni (or Kafka, Snitzer or Waarts et al.) considered any technique for the effective use of multi-mode double-clad fibers as diffraction-limited or near diffraction-limited high-power amplifiers. No methods were described for exciting the fundamental mode in multi-mode amplifiers, no methods were described for minimizing mode-coupling in multi-mode amplifiers and no methods were described for controlling the excitation and the size of the fundamental mode by gain-guiding or by the implementation of an optimized distribution of the dopant ions inside the multi-mode fiber core.

Moreover, the specific pump injection technique suggested by DiGiovanni comprises built-in limitations for the efficiency of fundamental-mode excitation in multi-mode fiber amplifiers. DiGiovanni considers a fused taper bundle with a single-mode fiber pig-tail in the center of the bundle, which is then spliced to the double-clad amplifier fiber to simultaneously deliver both the pump light (via the outside fibers of the fused taper bundle) and the signal light (via the single-mode fiber pig-tail) to the amplifier fiber. Due to the limited packing ability of circular structures, air gaps remain in the fiber bundle before tapering. Once tapered, surface tension pulls all the fibers in the fiber bundle together, essentially eliminating the air gaps (as discussed by DiGiovanni et al.). As a result the outside cladding of the taper bundle becomes distorted (resulting in a non-circular shape with ridges where the fibers were touching and with valleys where there were air-gaps). Hence the central core region and the fundamental mode also become distorted which limits the excitation efficiency of the fundamental mode in a MM fiber when splicing the fiber bundle to the double-clad fiber. In fact any geometric differences in the cladding shape of the fiber bundle or the double-clad fiber will lead to a limited excitation efficiency of the fundamental mode in the MM fiber in the process of splicing.

For reducing size and cost of the system as well as for increasing efficiency of the amplification side-pumping (as described in aforementioned U.S. Pat. No. 5,818,630) rather than end-pumping might be advantageous. For the benefits of fiber reliability the use of fiber couplers is preferred. The use of fiber couplers for pump light injection into MM fibers is discussed in aforementioned U.S. Ser. No. 09/199,728.

Normally for many applications a single polarization is desirable, so the use of polarization preserving fiber is desirable. There are several means of making polarization preserving fiber. However, for multimode fiber, elliptical core fiber is the easiest to manufacture and to obtain at this time.

Another attractive feature would be ease of fiber coupling the laser to the application, by using the amplifier fiber as the fiber delivery system, or a multimode undoped fiber spliced to the end of the amplifier fiber. This is similar to the fiber delivery system described in U.S. Pat. No. 5,867,304 and its progeny, herein incorporated by reference, where a multimode fiber is used for delivery of a single mode beam. The purpose is to lower the intensity in the fiber by using the larger effective mode-field diameter. This allows higher peak powers; >1 KW pulses can be transmitted without the onset of nonlinear processes. In U.S. Pat. No. 5,867,304, this fiber is used with ultrashort pulses where the fiber dispersion distorts the pulses. However, with nanosecond pulses, dispersion has a negligible effect on the pulse width so dispersion compensation is not necessary.

SUMMARY OF THE INVENTION

According to the invention, the goals set out in the foregoing are achieved through the use of a miniature Q-switched pulse source which is coupled to a doped Yb fiber laser which obtains single mode amplification in a multi mode fiber. Short pulse duration, efficiency, high power, high energy, cost efficiency and compactness are essentially achieved through the use of the combination of a compact diode-pumped microchip laser and a specially designed diode-pumped fiber amplifier. Short duration is achieved through the short cavity length of a microchip laser, whereas high efficiency is achieved through the use of a Yb-doped fiber amplifier pumped at ~980 nm. High power is achieved through cladding pumping geometry, and large fiber core (high core to cladding ratio).

High energy is achieved through a number of design features: the large core, with single mode excitation and propagation, allows a large cross-sectional area and, consequently, permits relatively low peak intensities and high saturation energies. Further, the large core provides a good core-to-cladding ratio, which in conjunction with the high doping level available for Yb significantly reduces the pump absorption length and allows for short amplifier lengths (0.1 to ~2 m), thus reducing detrimental nonlinear effects in the fiber without compromising power and energy extraction efficiencies. For very large cores, direct in-core pumping can be used. Side pumping provides higher power extraction efficiency and shorter interaction length compared to copropagating geometries (along with pump diode protection). Pigtailing of the fiber ends increases the surface damage threshold and allows a significant increase in output pulse energies and powers, while a composite core allows the robust coupling of the microchip seed pump into a fundamental mode of the fiber core. This also permits use of a non-perfectly-gaussian input beam from the microchip laser.

BRIEF DESCRIPTION OF THE DRAWINGS

FIG. 1 is a schematic layout of the laser system of the invention;

FIG. 2a illustrates a typical layout of the actively Q-switched micro chip laser;

FIG. 3 illustrates the temporal profile of the output of the lasers of FIGS. 2 and 2a; and FIGS. 4 and 4a, where FIG. 4 is presented as an inset in FIG. 1, illustrate a fiber-end coupling and optical damage avoidance technique.

DETAILED DESCRIPTION OF THE PREFERRED EMBODIMENTS

Figure 2:
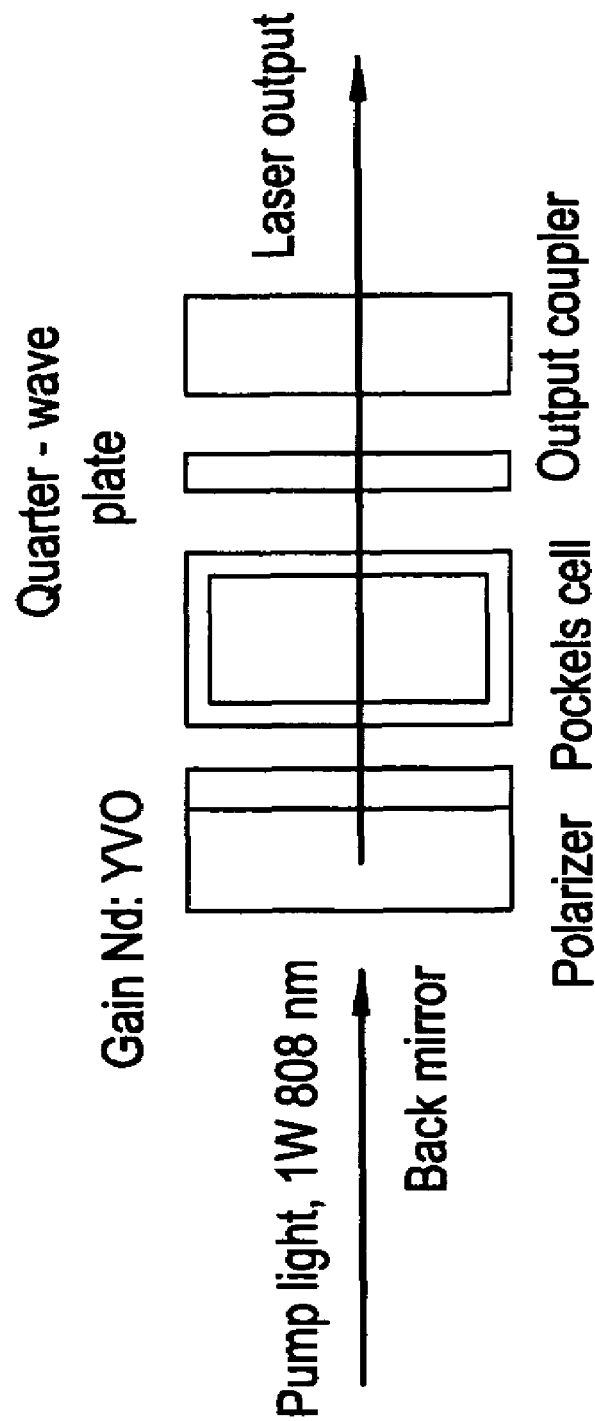
FIG. 2 illustrates schematically one actively Q-switched micro-laser according to the invention.

FIG. 1 illustrates the system configuration of the laser according to the present invention. In this Figure, reference numeral 101 indicates a microchip laser source, illustrated in greater detail in FIGS. 2 and 2(a). It should be noted that, as used herein, the term "micro chip laser" refers to a laser of small device size, where at least some of the components, such as the gain medium and the end mirror, are monolithic. In this specification, the terms "microchip laser" and "micro-laser" are used interchangeably to refer to a laser having these characteristics. As described in detail below, the micro chip laser 101 according to the invention is an actively Q-switched laser which is typically diode pumped.

In order to achieve excitation of only the fundamental mode in a multimode-core fiber amplifier, the beam waist $\omega_{input}$ of a mode coupled into the amplifier from a microchip laser has to approximately match the beam waist $\omega$mode of this fundamental mode: $\omega_{input} \approx \omega_{mode}$. Note, that for the step-index fiber $\omega_{mode} = 0.7\, r_{core}$, where $r_{core}$ is the radius of a fiber core. Therefore, the output of the microchip laser 101 has to be directed into the fiber amplifier input (FIG. 4) through properly designed mode-matching optics 102. The essential function of this mode-matching optical arrangement is to transform the mode size of an optical beam at the output of a microchip laser (output into the proper beam size $\omega_{input}$ at the input of the fiber amplifier. This imaging function can be achieved by a variety of optical arrangements, one example of which is schematically represented in FIG. 1. Note that the focusing lens in this arrangement is also used to focus the pump light from a laser diode, and that it is essential for our invention to achieve focusing of these two input beams at two different planes, as described below.

The inventors have determined experimentally that limitations on the maximum extractable energies in a fiber amplifier originate from a number of effects, two significant ones being the Raman gain and surface damage at the input and output facets of the fiber core.

The optical damage threshold at the surface of a glass is characterized by the optical intensity $I_{th}^{damage}$ of an optical beam at this surface. Generally, this threshold intensity is determined by the type of material used and by its surface quality. It also depends on the duration of the pulse and average power (repetition rate) of the pulse train. As is known, the threshold intensity for optical damage in the nanosecond range decreases as the reciprocal of the square root of the laser temporal pulsewidth: $I_{th}^{damage} \propto 1/\sqrt{T_{pulse}}$.

Figure 4A:
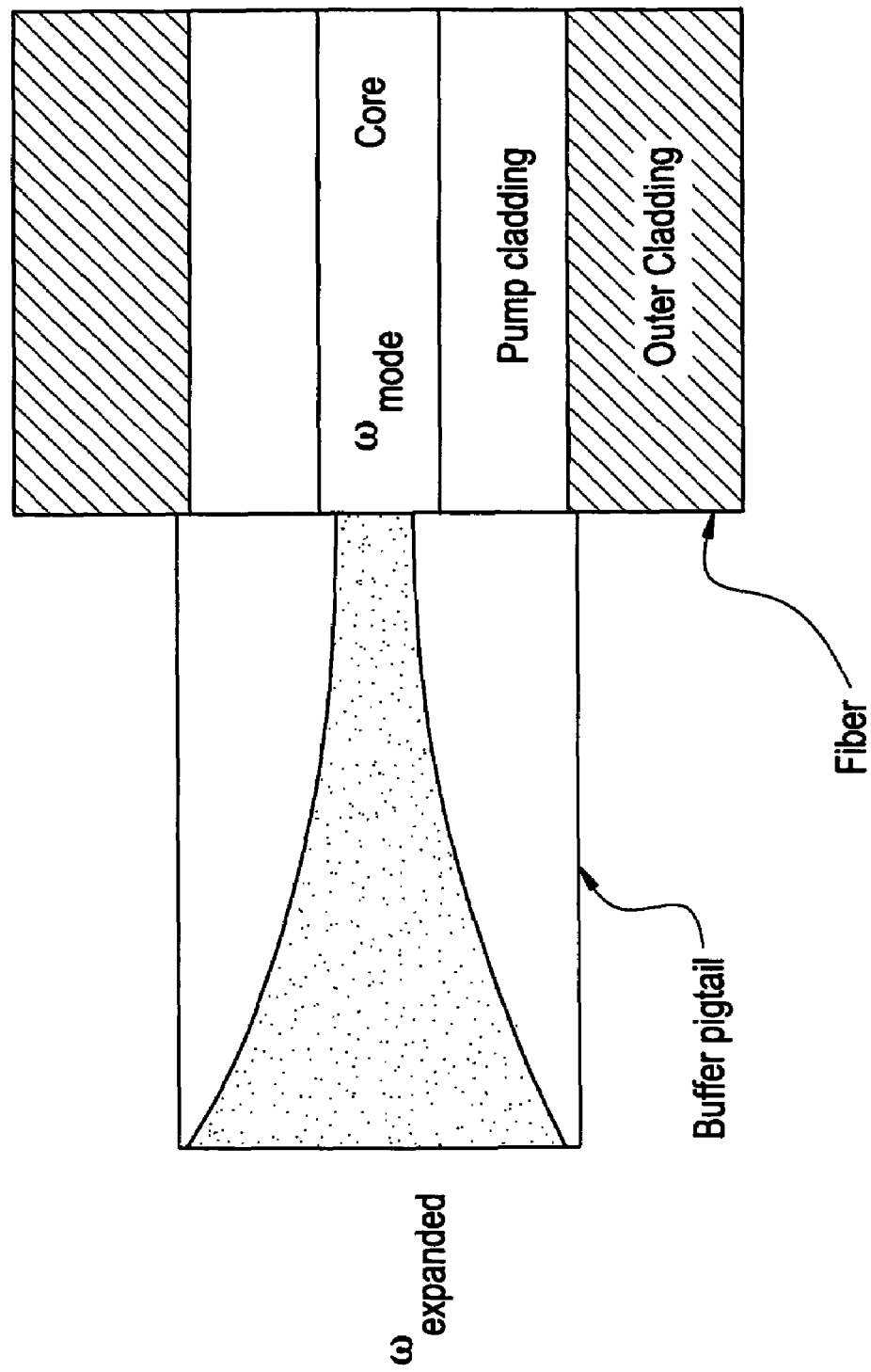

The inventors have demonstrated that the optical surface damage threshold can be significantly increased by using a beam expansion technique, as shown schematically in FIG. 4 and in greater detail in FIG. 4a. Here, the fiber-end is bonded to a buffer of the same material as the fiber. At the end surface, the optical beam will be expanded to $\omega_{expanded}$ according to:

$$\omega_{expanded} = \omega_{mode}\sqrt{(1 + 2L/\omega_{mode}^2 k)}$$

Here, $k = 2\pi n/\lambda$, n is the glass refractive index, $\lambda$ is the wavelength of the amplified signal and L is the thickness of the buffer. It is critical that the quality of the bond between the surfaces of the fiber and the buffer be sufficiently high to eliminate any optical interface, and, thus, to eliminate surface damage at this surface. Various known bonding techniques can be used to achieve this quality. In the present case, a silica-glass rod of the same diameter as the outer diameter of the pump-cladding was spliced to the end of the fiber. The maximum improvement $\eta$ of the damage threshold is determined by the square of the ratio between the radius of the buffer rod $R_{buffer}$ and the size of the core mode $\omega_{mode}$: $\eta = (R_{buffer}/\omega_{mode})^2$. In the case of a 50 micron core and a 300 micron buffer pigtail as used in our experimental configuration the improvement was found to be ~70 times. Such buffer-pigtail protection is required for both input and output ends of an amplifier. In the case signal and pump beams are entering the same end of a fiber (copropagating configuration) the incoming laser beam has to be focused on the end of the fiber, as shown in FIG. 4a, inside the bonded buffer, where there is no interface. If the bonded buffer is a coreless rod of the same diameter as fiber-amplifier inner cladding (pump cladding), as shown in FIG. 4a, the pump beam should be focused at the entrance facet of this silica rod. Note, that generally this buffer can be a slab with transverse dimension much larger than the pump cladding. In this case pump beam could be directly focused into the pump cladding. In the case side pumping is used via a V-groove or a fiber pigtail the corresponding element can be either placed directly in the fiber amplifier after the buffer bonding point, or (if a silica rod is used as a buffer) in this coreless pigtail.

The Raman effect causes the spectrum of the amplified pulse to shift towards the longer wavelengths and outside the amplification bandwidth of the Yb-fiber amplifier. Raman effect onset is characterized by a threshold intensity $I_{th}^{Raman}$ in the fiber core which, as is known in the prior art, is inversely proportional to the effective propagation length $L_{eff}$ of an amplified pulse and the Raman gain coefficient: $I_{th}^{Raman} \propto 1/L_{eff} g_{Raman}$. Since the Raman gain coefficient is determined by the fiber glass properties, in order to maximize extractable peak powers and, hence, pulse energies, one has to increase the core size and decrease the interaction length. The interaction length can be reduced by using fibers with high doping level which lowers the fiber length, propagating amplified pulses opposite to the direction of the pump beam which lowers the pulse energy until the end of the fiber where the gain will be higher. Also, use of multimode large core fibers in the double clad configuration facilitates pump absorption and allows shorter amplifier lengths.

It is important to note that for certain applications the presence of strong Raman components in the amplified pulses does not reduce the usability of these pulses. One example is laser marking. The inventors demonstrated experimentally that surface marking is not sensitive to the Raman spectral shift and there is no degradation in the marking quality even for pulses with only a small fraction of the total energy in non-Raman shifted spectral components. In one specific example, this allowed use of ~150 μJ of total pulse energy vs ~40 μJ that was available without Raman shifting. Thus, for this type of application significantly higher energies are available from this particular fiber amplifier.

However, many applications are sensitive to the presence of the Raman shift. For example, when wavelength shift is required prior to end use, via second-harmonic or other frequency conversion methods, the Raman component would significantly reduce the efficiency of this conversion and would produce large amplitude fluctuations. For such applications, a number of existing techniques currently employed in fiber telecommunication systems (See, OFC'95 Tutorial Session) could be used for Raman-effect reduction in the fiber amplifiers, in addition to the methods described in this invention for optimizing fiber amplifiers in order to minimize their susceptibility to Raman effect.

The fiber amplifier 103 is a Yb-doped large-core cladding-pumped fiber amplifier. The core diameter of this fiber is approximately 10 micrometers-1 mm in diameter and thus is a true multimode fiber. However, this multimode fiber performs single mode amplification using the techniques described in U.S. Pat. No. 5,818,630, herewith incorporated by reference.

Reference numeral 104 illustrates the pump for the Yb multimode fiber laser. The pump is advantageously configured as a side-pumping broad area laser diode, the details of which are well known in the art. The Yb fiber amplifier can transform the pump power into an optical output with an extremely high efficiency of 90%. In addition, the multimode Yb amplifier fiber produces an output which is higher by more than an order of magnitude over that obtainable with a corresponding conventional single mode fiber amplifier. The combination of extremely high efficiency and high gain allows the source microchip laser to operate in a relatively low energy, higher efficiency regime with little input power.

FIGS. 2 and 2(a) illustrate two preferred embodiments of the micro-laser or microchip laser used according to the invention. These devices are extremely compact, simple, inexpensive and have low power requirements, yet produce extremely short high peak power pulses. According to the invention, the microlasers employed are diode pumped lasers which are actively Q-switched. A primary advantage of these miniature lasers is that they readily provide output laser pulses of very short duration as a consequence of their short laser cavities. Active Q-switching gives good control over the repetition rate and the number of pulses delivered at a time, which is useful in marking and micromachining applications.

The microchip laser is a solid-state device designed to provide nanosecond laser pulses at 1064 nm wavelength. Diode pumping enables high pump-to-laser efficiency, compact design, and reduced thermal problems in the gain material. The cavity is designed to provide the shortest possible pulse duration achievable with active Q-switching with moderate (3 micro J) pulse energy.

Two representative laser cavity designs are shown in the Figures. The gain material is Nd doped Yttrium Orthovanadate (Nd:YVO$_4$) at 1% doping level. It is cut and oriented in a way (a-cut) to provide maximum absorption at the pump wavelength. In addition, the crystal is wedge shaped in FIG. 2a, which allows the laser to operate only in one linear polarization. The crystal is pumped longitudinally through its coated dichroic dielectric mirror surface 201. The pump laser 203 is a 100 micron wide laser diode with 1 Watt cw pump power. The coating 201 provides passage of pump light at 808 nm and reflection of laser light at 1064 nm. This surface acts also as a laser cavity mirror. The laser has a flat output coupler. Some thermal focusing in the cavity tends to stabilize the laser cavity mode, but it is basically an unstable resonator.

A Pockels cell 207 and a quarter-wave plate 209 inside the cavity form an electro-optic Q-switch. The Pockels cell is made of LiNbO$_3$, in the transversal field configuration. The Pockels cell at the off state has zero retardation. The quarter-wave plate provides a static half wave retardation of light in a round trip, which means changing the polarization of light inside the cavity. This opposite polarization is then deflected out of the cavity (FIG. 2a) by the wedge shaped gain material acting as a polarizer, or a polarizer is placed inside the cavity (FIG. 2). The laser is in the static off state with the voltage off at the Pockels cell. When the gain material is pumped continuously, the pump energy is stored in the gain material for approximately 100 microseconds, the fluorescence lifetime of the gain material. To Q-switch the laser, a fast, 2.5 ns rise time high voltage pulse (1200V) is applied to the Pockels cell. The voltage on the Pockels cell introduces a quarter-wave retardation, which compensates the retardation of the wave plate. The intra-cavity laser field then builds up unimpeded until it finally reaches saturation by depleting the gain. The laser pulse leaves the cavity through the output coupler 211, which has 70% reflectivity and 30% transmission. The resulting laser pulse has 750 ps pulse duration and 3 micro J energy (FIG. 3). A solid-state driving electronics circuit provides the fast, high voltage switching pulses for the Pockels cell with a repetition rate up to 15 kHz. To operate the laser as a cw source a static voltage can be applied to the Pockels cell.

Single longitudinal mode operation is often desired in lasers. Besides the favorable spectral properties to the laser, single-mode operation reduces the timing jitter. In single longitudinal mode operation there is no mode competition and gain cross-saturation between modes. As a result, the uncertainty of the turn-on time of the laser relative to the trigger pulse, the jitter, is reduced. Timing jitter of less than 100 ps is obtained when the laser operates in single mode.

The laser cavity is designed for single-longitudinal-mode operation. For long term stability it is particularly important that the laser cavity is stabilized against temperature induced changes. The cavity is designed so that temperature induced effects do not cause mode-hopping in the laser. The mechanical and optical construction of the laser is such that the thermal expansion of the base whereon the laser in mounted compensates for the thermal effects in the materials. In addition to thermal expansion, further consideration was given to high thermal conductivity and good electrical and mechanical properties of the base material, which enables temperature stabilization of the components.

Because the length of the resonator is approximately 8 mm, the laser can support 4 to 6 longitudinal modes at this cavity length. To achieve single mode operation we employed a resonant reflector etalon output coupler. The use of an resonant reflector etalon to maintain single mode operation is described in Koechner pp. 242-244. The output coupler is a solid Fabry-Perot etalon working in the reflection mode. Its reflectivity R is modulated as a function of wavelength. The maximum value of reflectivity occurs at the resonant wavelengths given by $$\delta_{etalon}/2\pi=m, \qquad (1)$$

where $\delta_{etalon}$ the phase difference between interfering optical beams in the etalon at consecutive reflections m is a half integer number (m=½, 3/2, 5/2, ... ).

On the other hand, resonant wavelengths of the laser cavity are determined by the total optical phase difference between beams of consecutive reflections inside the cavity, $\delta_{cav}$, $$\delta_{cav}=4\pi\Sigma(n_i l_i)/\lambda$$

The summation takes into account all the optical materials; gain material, Pockels cell, polarizer and quarter-waveplate material and air with their respective optical thickness $n_i$ $l_i$. The resonant condition for the cavity is $$\delta_{cav}/2\pi=n, \qquad (2)$$

where n is an integer value (n=1, 2, 3, ... ). Lasing occurs essentially when the resonant wavelength of the output coupler etalon coincides with the resonant wavelength of the laser resonator cavity. This is given by simultaneous satisfaction of the above half-integer and integer conditions for m and n respectively. The number of allowable modes under the gain profile can be restricted to 1 by proper choice of the output coupler etalon. In our embodiment of the microlaser a single uncoated LiNbO$_3$ plate of 1 mm thickness provides sufficient mode selectivity to allow the laser to operate in a single longitudinal mode.

The resonance conditions (1) and (2) are temperature dependent, since the thermal expansion and the thermal change of the refractive index changes the optical path-length in the laser cavity and in the resonant reflector output coupler. These effects combine to shift the resonance peaks of the resonant reflector and the laser cavity. We have a limited choice of the optical materials from which the laser is constructed. Their thermal expansion constants and thermal induced refractive index coefficients determine the thermal change of resonance conditions, which in general results in a mismatch of resonances (1) and (2) as the temperature changes and causes mode hopping of the laser. The thermal expansion of the base on which the laser is constructed also contributes to the change of the wavelength of the laser. We have a rather free choice of the base material. By using Aluminum Nitride ceramic as the laser base we achieved that the thermal shift of the laser wavelength was matched to the thermal shift of the resonance condition of the resonant reflector output coupler and mode hopping has not occurred within a 4 degree C. temperature interval. Temperature stabilization of the laser cavity within 1 degree C. resulted in continuous single longitudinal mode operation of the laser.

An alternative source may be a passively Q-switched microchip laser, which can be very inexpensive and may be preferred in some cases for this reason. The primary reason to use a miniature source is to keep the laser cavity short which reduces the pulse width of the laser.

The miniature laser is coupled to a doped fiber gain medium. In the invention this medium is a Yb:fiber.

In order to reach higher peak powers, the invention utilizes a multi-mode fiber to propagate single mode pulses as described in U.S. Pat. No. 5,818,630. As described above a mode converter is used to convert the single mode input to excite the fundamental mode of the multimode fiber. The mode converter 102 used in this case is a combination of lenses which mode-matches the output of the microchip laser to the beam diameter for single mode excitation of the multimode fiber. In addition to the lenses for mode-conversion, gain guiding in the Yb:fiber can be used to relax the tolerances on mode matching. Without gain in the Yb fiber, robust fundamental-mode excitation becomes increasingly difficult to achieve for the increasing core size of a fiber amplifier. We found experimentally that it is particularly advantageous to employ specially designed fibers in which Yb-doping in the center of the core has a significantly smaller diameter than the core itself. In this case, the fundamental mode light experiences significantly higher gain than multimode light. In our experimental configuration, we used 50 μm diameter core with 25 μm diameter doped region in the center, which exhibited a significantly more robust performance compared to 25 μm homogeneously doped core. Besides relaxing the alignment tolerances, the beam parameters of the source are also relaxed. As the microchip laser may not have a perfect diffraction limited beam output, gain guiding can be used to correct for this. Also, gain guiding can correct the distortion expected from DiGiovanni pump couplers.

The Yb fiber in this example had a 300 μm outer diameter and a 50 μm core. The use of relatively small cladding/core area ratios enabled by double-clad fibers, together with a large multi-mode core, allows for the efficient absorption of the pump with, for example, a gear-shape cladding cross section. The resultant Yb amplifier can be as short as 1.5 M long, as compared to 5-40 M which would be required of a typical single mode Yb amplifier.

Another advantage of this optical source is the ease of adding a multimode fiber delivery system which propagates a single-mode. In many applications fiber delivery is very important, such as in surgery, dentistry and marking in confined spaces. An example of marking in confined spaces is the marking of assembled automotive or other parts for antitheft purposes.

An additional advantage of the shorter pulse is that nonlinear processes for frequency conversion are more efficient with the higher peak powers which come from shorter pulses with similar energies. For certain applications where wavelength conversion is necessary, for example in UV-range radiation for via hole drilling, the output of the laser must be frequency tripled to create the UV radiation. This source, could, for example, replace frequency tripled Q-switched Nd:YAG lasers and eximer lasers for this application.

Another application where frequency conversion is important is dentistry. For example, in U.S. Pat. No. 5,720,894, it is described that UV radiation performs relatively damage free material removal by hard tissue ablation primarily due to the stronger absorption of that wavelength regime. Three preferred wavelengths for applications in medicine and dentistry are 2.1 μm, 2.9 μm and 1.55 μm like UV radiation, the preference is due to the strong absorption coefficient of biological tissues at these wavelengths.

The most straight forward means for generating 1.55 μm radiation is to use a laser source which emits at 1.55 μm and a doped fiber which amplifies 1.55 μm radiation. A microchip laser which emits 1.55 μm radiation is known, and described in Thony et al. It is well known that erbium fiber amplifies 1.51 μm radiation. An alternative source could be a compact erbium doped waveguide laser as described in; H. Suche, T.

Oesselke, J. Pandavenes, R. Ricken, K. Rochhausen, W. Sohler, S. Balsamo, I. Montrosset, and K. K. Wong "Efficient Q-switched Ti;Er:LiNbO$_3$ waveguide laser", Electron. Lett., Vol. 34, No. 12, 11th June 1998, pp 1228-1230.

Another alternative is to use a laser source which emits a different wavelength, such as that of the invention, and use a frequency conversion step to generate the 1.5 µm radiation. Examples of a nonlinear conversion step at the output include doubling, tripling, quadrupling, Raman shift, OPO, OPA or OPG. To generate 1.55 µm radiation, converting a 1.06 source in a PPLN OPG is quite convenient.

In order to generate other wavelengths such as 2.1 and 2.9 µm similar methods can be applied to this laser concept.

The multimode amplifier of the invention can also amplify a cw source or operate as a cw source. For example, a marking laser often has the option of being operated in a cw mode for generating more of a heat type mark. For the design of high-power cw lasers the use of MM fibers is advantageous as the reduced cladding/core area ratio reduces the absorption length in such structures. For very high cw laser powers, nonlinear effects can indeed occur and thus MM fibers can be used for the construction of compact ultra-high power cw fiber lasers. The MM fibers can then be effectively used for the pumping of fiber Raman amplifiers or for the construction of Raman lasers operating at wavelength regions shifted away from the gain band of the doped fibers.

As previously indicated, a number of major advantages are achieved according to the invention by employing the combination of a Q-switched microchip laser and a Yb: fiber amplifier. Because of the efficiency and gain of the Yb fiber amplifier, the output power of the microchip laser need not be large. The peak power of this amplifier is limited by nonlinear effects in the fiber and by the optical damage thresholds primarily at the fiber ends. The delivery fiber may be a simple multimode undoped fiber spliced to the end of the amplifier fiber, or the amplifier 103 can itself constitute the fiber delivery system. Thus, a simple, inexpensive laser system suitable for a wide variety of applications can be efficiently produced.

What is claimed is:

1. An apparatus for generating a pulsed laser output with a pulse width in the picosecond—low nanosecond regime and a pulse energy sufficient for micromachining or surgical applications, comprising:
    a seed source producing seed pulses;
    a fiber amplifier unit receiving said seed pulses and producing pulses with a pulse energy in a predetermined range;
    said fiber amplifier unit including at least one multi-mode fiber amplifier configured to propagate single-mode light;
    at least one bulk optical element receiving at least the output of said multimode amplifier; and
    a delivery system for said laser output.

2. An apparatus for generating a pulsed laser output with a pulse width in the picosecond—low nanosecond regime and a pulse energy sufficient for micromachining or surgical applications, comprising:
    a seed source producing seed pulses;
    a fiber amplifier unit receiving said seed pulses and producing pulses with a predetermined pulse energy;
    said fiber amplifier unit including at least one multi-mode fiber amplifier configured to propagate single-mode light; and
    at least one bulk optical element which frequency converts the pulses produced by said fiber amplifier unit, and
    a delivery system for said laser output.

3. An apparatus for generating a pulsed laser output with a pulse width in the picosecond—low nanosecond regime and a pulse energy sufficient for micromachining or surgical applications, comprising:
    a seed source producing seed pulses;
    a fiber amplifier unit receiving said seed pulses and producing pulses with a predetermined pulse energy;
    said fiber amplifier unit including at least one multi-mode fiber amplifier configured to propagate single-mode light; and
    at least one bulk optical element which amplifies the pulses produced by said fiber amplifier unit; and
    a delivery system for the laser output.

4. An apparatus for generating a pulsed laser output with a pulse width in the picosecond—low nanosecond regime and a pulse energy sufficient for micromachining or surgical applications, comprising:
    a seed source producing seed pulses;
    a fiber amplifier unit receiving said seed pulses and producing pulses with a predetermined pulse energy;
    said fiber amplifier unit including at least one multi-mode fiber amplifier configured to propagate single-mode light; and
    a compressor unit for compressing said pulses prior to output; and
    a delivery system for said laser output.

5. An optical apparatus for generating pulses with a pulse width in the picosecond—low nanosecond regime, comprising:
    a seed source producing seed pulses;
    a fiber amplifier unit receiving said seed pulses and producing an amplified output;
    said fiber amplifier unit including at least one multi-mode fiber amplifier configured to propagate single-mode light; and
    at least one bulk optical element receiving at least the output of said multimode amplifier.

6. An optical apparatus for generating pulses with a pulse width in the picosecond—low nanosecond regime, comprising:
    a seed source producing seed pulses;
    a fiber amplifier unit receiving said seed pulses and producing an amplified output;
    said fiber amplifier unit including at least one multi-mode fiber amplifier configured to propagate single-mode light; and
    at least one bulk optical element which frequency converts the pulses produced by said fiber amplifier unit.

7. An optical apparatus for generating pulses with a pulse width in the picosecond—low nanosecond regime, comprising:
    a seed source producing seed pulses;
    a fiber amplifier unit receiving said seed pulses and producing an amplified output;
    said fiber amplifier unit including at least one multi-mode fiber amplifier configured to propagate single-mode light; and
    at least one bulk optical element which amplifies the pulses produced by said fiber amplifier unit.

8. An optical apparatus for generating pulses with a pulse width in the picosecond—low nanosecond regime:
    a seed source producing seed pulses;
    a fiber amplifier unit receiving said seed pulses and producing amplified pulses;
    said fiber amplifier unit including at least one multi-mode fiber amplifier configured to propagate single-mode light; and a compressor unit for compressing said pulses prior to output.

9. The apparatus according to claim 1, wherein the seed source is a microchip laser.

10. The apparatus according to claim 2, wherein the seed source is a microchip laser.

11. The apparatus according to claim 3, wherein the seed source is a microchip laser.

12. The apparatus according to claim 4, wherein the seed source is a microchip laser.

13. The optical apparatus according to claim 5, wherein the seed source is a microchip laser.

14. The optical apparatus according to claim 6, wherein the seed source is a microchip laser.

15. The optical apparatus according to claim 7, wherein the seed source is a microchip laser.

16. The optical apparatus according to claim 8, wherein the seed source is a microchip laser.

* * * * *